US010200699B2

(12) United States Patent
Yamori

(10) Patent No.: US 10,200,699 B2
(45) Date of Patent: Feb. 5, 2019

(54) APPARATUS AND METHOD FOR ENCODING MOVING PICTURE BY TRANSFORMING PREDICTION ERROR SIGNAL IN SELECTED COLOR SPACE, AND NON-TRANSITORY COMPUTER-READABLE STORAGE MEDIUM STORING PROGRAM THAT WHEN EXECUTED PERFORMS METHOD

(71) Applicant: FUJITSU LIMITED, Kawasaki-shi, Kanagawa (JP)

(72) Inventor: Akihiro Yamori, Kawasaki (JP)

(73) Assignee: FUJITSU LIMITED, Kawasaki-shi (JP)

( * ) Notice: Subject to any disclaimer, the term of this patent is extended or adjusted under 35 U.S.C. 154(b) by 178 days.

(21) Appl. No.: 15/340,287

(22) Filed: Nov. 1, 2016

(65) Prior Publication Data
US 2017/0150157 A1    May 25, 2017

(30) Foreign Application Priority Data
Nov. 20, 2015    (JP) .................. 2015-227686

(51) Int. Cl.
*H04N 11/02*    (2006.01)
*H04N 19/186*    (2014.01)
(Continued)

(52) U.S. Cl.
CPC ......... *H04N 19/186* (2014.11); *H04N 19/107* (2014.11); *H04N 19/124* (2014.11);
(Continued)

(58) Field of Classification Search
CPC .................................................. H04N 19/186
(Continued)

(56) References Cited

U.S. PATENT DOCUMENTS 6,124,811 A * 9/2000 Acharya ................. H03M 7/40
                                                            341/63
7,728,851 B2 * 6/2010 Kuno ....................... G09G 5/14
                                                            345/592
(Continued)

FOREIGN PATENT DOCUMENTS

JP    2014-195145    10/2014

OTHER PUBLICATIONS

"HEVC Screen Content Coding Extension (SCC)", [online], [searched on Oct. 7, 2015], the Internet <URL: https://hevc.hhi.fraunhofer.de/scc>, 1 page.

*Primary Examiner* — Leron Beck
(74) *Attorney, Agent, or Firm* — Staas & Halsey LLP

(57) ABSTRACT

An apparatus for encoding a moving picture determines either an RGB format or a YUV format, in which intra prediction and inter prediction are executed based on a degree of deviation of information regarding each of R, G, and B components in moving picture data with the RGB format when a prediction selecting one component among three components in a color space format is designated in the input moving picture data with the RGB format, selects either color space format between the RGB format and the YUV format based on a determination result of the determination process, and executes orthogonal transform and quantization on the prediction error signal in the selected color space format and generating an encoded bit stream using a value subjected to the orthogonal transform and the quantization.

20 Claims, 18 Drawing Sheets

(51) Int. Cl.
*H04N 19/124* (2014.01)
*H04N 19/107* (2014.01)
*H04N 19/159* (2014.01)
*H04N 19/527* (2014.01)
*H04N 19/547* (2014.01)
*H04N 19/61* (2014.01)
*H04N 19/65* (2014.01)
*H04N 19/70* (2014.01)

(52) U.S. Cl.
CPC ......... *H04N 19/159* (2014.11); *H04N 19/527* (2014.11); *H04N 19/547* (2014.11); *H04N 19/61* (2014.11); *H04N 19/65* (2014.11); *H04N 19/70* (2014.11)

(58) Field of Classification Search
USPC ...................................... 375/240.03
See application file for complete search history.

(56) References Cited

U.S. PATENT DOCUMENTS

| | | | | |
|---|---|---|---|---|
| 9,609,336 B2* | 3/2017 | Topiwala | ............. | H04N 19/164 |
| 9,883,184 B2* | 1/2018 | Rapaka | ................ | H04N 19/124 |
| 2004/0212817 A1* | 10/2004 | Hagai | ................... | H04N 1/6019 |
| | | | | 358/1.9 |
| 2005/0259730 A1* | 11/2005 | Sun | ....................... | H04N 11/042 |
| | | | | 375/240.03 |
| 2006/0233251 A1* | 10/2006 | Kim | ..................... | H04N 19/139 |
| | | | | 375/240.12 |
| 2008/0019597 A1* | 1/2008 | Song | ................... | H04N 19/105 |
| | | | | 382/233 |
| 2008/0117970 A1* | 5/2008 | Song | ....................... | H04N 1/648 |
| | | | | 375/240.13 |
| 2009/0147856 A1* | 6/2009 | Song | ................... | H04N 19/172 |
| | | | | 375/240.23 |
| 2009/0257491 A1* | 10/2009 | Kondo | .................. | H04N 19/30 |
| | | | | 375/240.12 |
| 2011/0181746 A1* | 7/2011 | Free | ................... | G06K 9/00234 |
| | | | | 348/222.1 |
| 2014/0376611 A1* | 12/2014 | Kim | ..................... | H04N 19/176 |
| | | | | 375/240.02 |
| 2015/0146976 A1* | 5/2015 | Ma | ........................ | H04N 1/646 |
| | | | | 382/166 |
| 2015/0264374 A1* | 9/2015 | Xiu | ...................... | H04N 19/176 |
| | | | | 375/240.25 |
| 2016/0073114 A1 | 3/2016 | Kawamura et al. | | |
| 2016/0360198 A1* | 12/2016 | Chang | ................... | H04N 19/96 |

\* cited by examiner

APPARATUS AND METHOD FOR ENCODING MOVING PICTURE BY TRANSFORMING PREDICTION ERROR SIGNAL IN SELECTED COLOR SPACE, AND NON-TRANSITORY COMPUTER-READABLE STORAGE MEDIUM STORING PROGRAM THAT WHEN EXECUTED PERFORMS METHOD

CROSS-REFERENCE TO RELATED APPLICATION

This application is based upon and claims the benefit of priority of the prior Japanese Patent Application No. 2015-227686, filed on Nov. 20, 2015, the entire contents of which are incorporated herein by reference.

FIELD

The embodiments discussed herein are related to an apparatus for encoding a moving picture, a method of encoding a moving picture, and a non-transitory computer-readable storage medium.

BACKGROUND

Past encoding for moving pictures is mainly executed in the YUV format. The YUV format is a color space format that is formed by a luminance component Y and two color difference components U and V. That is, in past encoding for moving pictures, input image data is transformed into the YUV format to be encoded in a case in which the input image data has the RGB format. Incidentally, requests for desiring to execute encoding image signals from imaging apparatuses (input sources) such as digital cameras while maintaining color space formats of the input sources have recently increased. Therefore, in the H.265/HEVC standard which is a latest moving picture encoding standard, a mode in which input moving picture data is encoded while maintaining the RGB format in a case in which the input moving picture data has the RGB format has been added. In this encoding mode, a signal with the RGB format is encoded in accordance with the same scheme as a signal with the YUV format.

This encoding method is realized with screen content coding (SCC) which is an extension of HEVC. In encoding for a moving picture to which the SCC is applied, in a case in which a moving picture with the RGB format is input, the moving picture is encoded assuming that a G component (green component) corresponds to the Y component of the YUV format.

In the SCC, a technology called adaptive color transform (ACT) is defined as an encoding tool. In the ACT, a path through which the RGB format is transformed into the YUV format is added before a prediction error signal is subjected to orthogonal transform. Then, either the RGB format or the YUV format is determined to execute orthogonal transform and quantization for each subblock set in a processing block. In a case in which the ACT is turned on, a format is transformed into the YUV format and orthogonal transform and quantization are executed. In a case in which the ACT is turned off, orthogonal transform and quantization are executed while maintaining the RGB format. In the ACT, a path through which a subblock with the YUV format in a prediction error signal restored by executing inverse quantization and inverse orthogonal transform on a quantized value (transform coefficient) is transformed into the RGB format is added, and a decoded image in which all of the subblocks have the RGB format is generated. In the HEVC standard, a processing block is called a coding unit (CU) and a subblcok in orthogonal transform and quantization is called a transform unit (TU). For each subblock included in the processing block, transform between the RGB format and the YUV format is defined as complete reversible transform so that a problem does not occur even when the ACT is switched to be turned on and off.

As an example of a technology of the related art, there is known "HEVC Screen Content Coding Extension (SCC)", [online], [searched on Oct. 7, 2015], the Internet <URL: https://hevc.hhi.fraunhofer.de/scc>.

SUMMARY

According to an aspect of the invention, an apparatus for encoding a moving picture includes a memory; and a processor coupled to the memory and configured to execute a determination process, a selection process, and a transform process. The determination process includes determining either color space format between an RGB format and a YUV format, in which intra prediction and inter prediction are executed based on a degree of deviation of information regarding each of R, G, and B components in moving picture data with the RGB format in a case in which a prediction selecting one component among three components in a color space format is designated in the input moving picture data with the RGB format. The selection process includes selecting either color space format between the RGB format and the YUV format, in which a prediction error signal for the moving picture data with the RGB format is encoded based on a determination result of the determination process. The transform process includes executing orthogonal transform and quantization on the prediction error signal in the selected color space format and generating an encoded bit stream using a value subjected to the orthogonal transform and the quantization.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In encoding for a moving picture, a prediction mode in which three components indicating color space information is independently predicted in intra prediction and inter prediction and a prediction mode in which any one component of the three components is mainly used for the prediction are prepared.

In a case in which moving picture data with the RGB format is input, prediction using only the R component, prediction using only the G component, and prediction using only the B component are executed in the prediction mode in which the three components are independently predicted. In contrast, in a case in which moving picture data with the RGB format is input, only prediction using, for example, the G component is executed in the prediction mode in which any one of the three components is used for the prediction.

However, in the prediction mode in which three components, R, G, and B components, are independently predicted, a calculation amount is considerable when a search range of a motion vector in the inter prediction is enlarged.

In contrast, in the prediction mode in which any one of the three components, R, G, and B components, is mainly used, there is a possibility of search precision of a motion vector in the inter prediction being lowered in a case in which information meaningful in the selected one component is not concentrated.

As one aspect of the embodiment, provided are solutions for being able to improve prediction precision when a moving picture with the RGB format is encoded.

Figure 1:
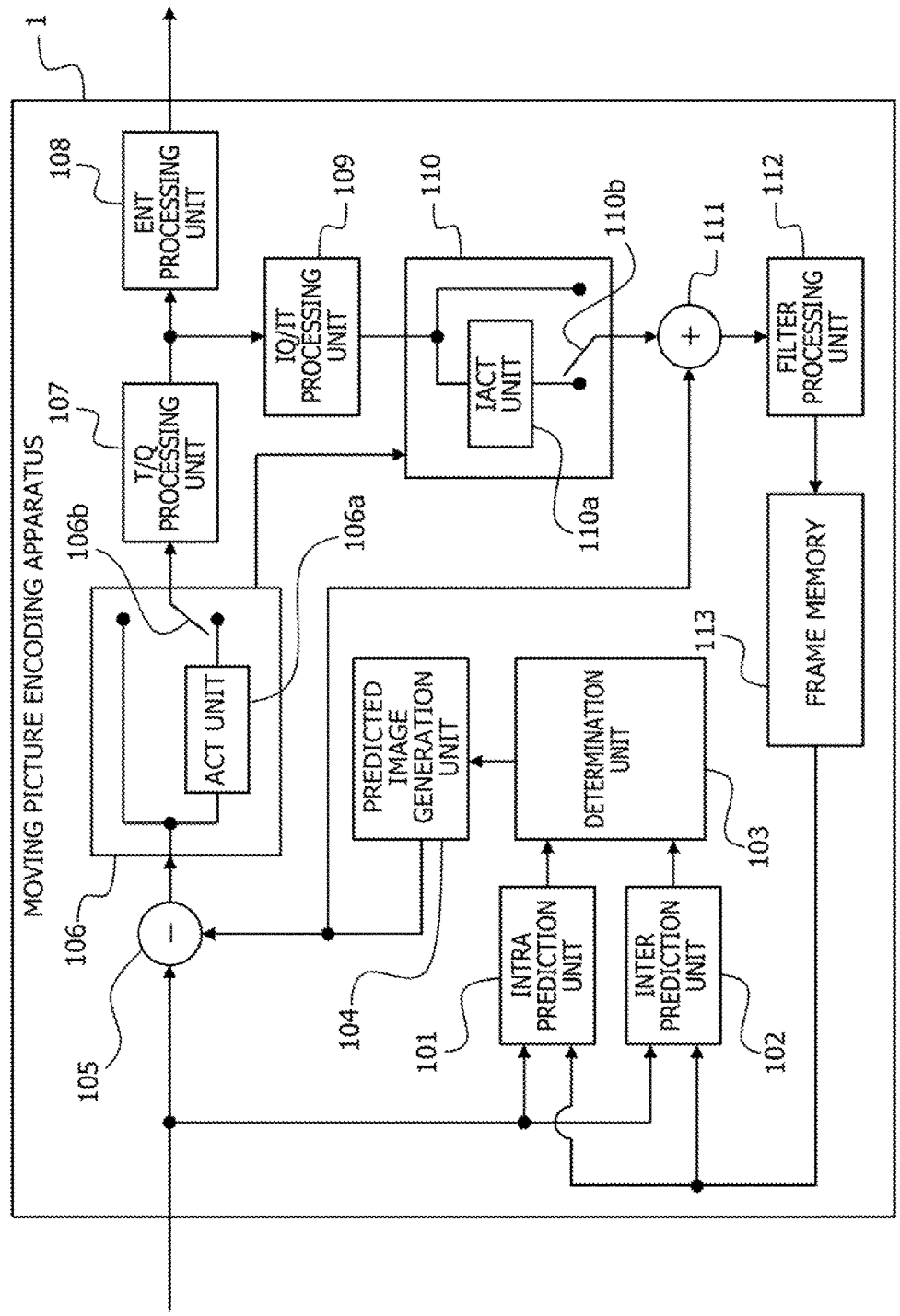
FIG. 1 is a diagram illustrating a functional configuration of a moving picture encoding apparatus to which ACT is applied.

FIG. 1 is a diagram illustrating a functional configuration of a moving picture encoding apparatus to which ACT is applied.

As illustrated in FIG. 1, a moving picture encoding apparatus 1 to which the ACT is applied includes an intra prediction unit 101, an inter prediction unit 102, a determination unit 103, a predicted image generation unit 104, and a prediction error signal generation unit 105. The moving picture encoding apparatus 1 includes a color space selection unit 106, a T/Q processing unit 107, and an ENT processing unit 108. The moving picture encoding apparatus 1 further includes an IQ/IT processing unit 109, a color space restoration unit 110, a decoded image generation unit 111, a filter processing unit 112, and a frame memory 113.

The intra prediction unit 101 executes intra prediction (also referred to as intra frame prediction) referring to a decoded image obtained by decoding pixel data encoded in a picture (moving picture data) of a current encoding process target. The inter prediction unit 102 executes inter prediction (inter frame prediction) referring to a decoded image of an encoded picture different from the picture of the current encoding process target. The determination unit 103 determines a prediction result used to generate a predicted image of each processing block based on a prediction result of the intra prediction unit 101 and a prediction result of the inter prediction unit 102. The decoded images used for the intra prediction and the inter prediction are stored in the frame memory 113. In a case in which a moving picture is encoded in conformity with the H.265/HEVC standard, intra prediction, inter prediction, and determination of prediction results are executed based on a prediction unit (PU) unit set in a processing block (CU).

The predicted image generation unit 104 generates a predicted image based on the determination result of the determination unit 103. The prediction error signal generation unit 105 generates a difference signal between input data (original image data) and a predicted image of a processing block in a frame of the current encoding process target as a prediction error signal.

In a case in which moving picture data (frame) with the RGB format is input, the moving picture encoding apparatus 1 illustrated in FIG. 1 executes prediction of an intra frame, prediction of an inter frame, generation of a predicted image, and generation of a prediction error signal while maintaining the RGB format.

The color space selection unit 106 selects whether a color space is transformed from the RGB format into the YUV format based on a transform unit (TU) unit set in the processing block. The color space selection unit 106 includes an ACT unit 106a and a switch 106b. In a case in which the color space is transformed into the YUV format, the color space selection unit 106 switches the switch 106b to the side of the ACT unit 106a. The ACT unit 106a transforms the color space of a subblock (TU) from the RGB format into the YUV format using a predetermined transform matrix. A color space format for which complete reversible transform with the RGB format is possible, for example, the YCgCo format, is used as the YUV format.

The T/Q processing unit 107 executes orthogonal transform and quantization on the prediction error signal based on the subblock (TU) unit.

The ENT processing unit 108 executes arithmetic encoding such as context-based adaptive binary arithmetic coding (CABAC) or another entropy encoding process on a value (transform coefficient) quantized by the T/Q processing unit 107 to generate an encoded bit stream.

The IQ/IT processing unit 109 executes inverse quantization and an inverse orthogonal transform on a value quantized by the T/Q processing unit 107 based on the subblock (TU) unit to restore a prediction error image before quantization.

In a case in which a subblock with the YUV format is included in the prediction error image restored by the IQ/IT processing unit 109, the color space restoration unit 110 transforms the color space format of the subblock into the RGB format. The color space restoration unit 110 includes an TACT unit 110a and a switch 110b. The color space restoration unit 110 specifies a subblock subjected to the orthogonal transform and the quantization in the YUV format based on transform information of a color space of each subblock in the color space selection unit 106. In a case in which the YUV format is transformed into the RGB format, the color space restoration unit 110 switches the switch 110b to the side of the IACT unit 110a. The IACT unit 110a transforms the color space of the subblock with the YUV (YCgCo) format into the RGB format using the predetermined transform matrix.

The decoded image generation unit 111 generates a local decoded image with the RGB format in regard to the original image data based on the prediction error image with the RGB format restored by the IQ/IT processing unit 109 and the color space restoration unit 110 and the predicted image with the RGB format and generated by the predicted image generation unit 104.

The filter processing unit 112 executes a filter process such as a deblocking filter process or a sample adaptive offset (SAO) process on the local decoded image.

The frame memory 113 accumulates the local decoded image subjected to the filter process. The accumulated local decoded images are used in a prediction process on a frame to be processed subsequently.

As described above, the color space selection unit 106 of the moving picture encoding apparatus 1 illustrated in FIG. 1 selects either the RGB format or the YUV format to execute the orthogonal transform and the quantization on the prediction error signal. In a case in which the orthogonal transform and the quantization are executed in the YUV format, the ACT unit 106a of the color space selection unit 106 transforms the prediction error signal from the RGB format into the YUV format. At this time, the ACT unit 106a transforms the prediction error signal in the YCgCo format for which the complete reversible transform with the RGB format is possible.

The YCgCo format is an expression format of a color space in which a color of an image is expressed by a luminance signal Y, a color difference signal Cg of a green component, and a color difference signal Co of an orange component. A relation indicated in the following Equation (1) is established between the components Y, Cg, and Co of the YCgCo format and the components R, G, and B of the RGB format.

$$\begin{bmatrix} G \\ B \\ R \end{bmatrix} = \frac{1}{8}\begin{bmatrix} 1 & 1 & 0 \\ 1 & -1 & -1 \\ 1 & -1 & 1 \end{bmatrix}\begin{bmatrix} 8 & 0 & 0 \\ \beta_{C_g} & 8 & 0 \\ \beta_{C_o} & 0 & 8 \end{bmatrix}\begin{bmatrix} Y \\ C_g \\ C_o \end{bmatrix} \quad (1)$$

$$= \frac{1}{8}\begin{bmatrix} 8+\beta_{C_g} & 0 & 0 \\ 8-(\beta_{C_g}+\beta_{C_o}) & -8 & -8 \\ 8-(\beta_{C_g}-\beta_{C_o}) & -8 & 8 \end{bmatrix}\begin{bmatrix} Y \\ C_g \\ C_o \end{bmatrix}$$

In Equation (1), βCg and βCo are integers.

That is, the ACT unit 106a of the color space selection unit 106 calculates values of the components Y, Cg, and Co from values of the components R, G, and B in the prediction error signal using a determinant of the matrix inversely transforming Equation (1).

The TACT unit 110a of the color space restoration unit 110 in the moving picture encoding apparatus 1 in FIG. 1 transforms the restored prediction error image obtained by executing a T/Q process and an IQ/IT process in the YUV (YCgCo) format into the RGB format. That is, the IACT unit 110a of the color space restoration unit 110 calculates values of the components R, G, and B from the values of the components Y, Cg, and Co in the restored prediction error signal using Equation (1).

The moving picture encoding apparatus 1 can encode a moving picture in conformity with the H.265/HEVC standard, as described above, and supports encoding of a moving picture input with the RGB format by screen content coding (SCC).

In such a kind of moving picture encoding apparatus 1, for example, a method of independently encoding three components, the R, G, and B components can be selected as an encoding method corresponding to a 4:4:4 format of the YUV format in a case in which input moving picture data has the RGB format. In this case, the moving picture encoding apparatus 1 executes the intra frame prediction and the inter frame prediction on each of the three components and executes encoding (monochrome encoding) on each component.

In a case in which the three components are independently encoded with the foregoing 4:4:4 format, information of the Cg and Co components is small in the YCgCo format despite the fact that the numbers of pixels of the Cg and Co components are the same as the number of pixels of the Y component. Therefore, prediction precision of the Cg and Co components deteriorates. Accordingly, in the case in which the three components are independently encoded, it is meaningful to execute the prediction in the RGB format rather than the YCgCo format.

However, when moving picture data with the RGB format input to the moving picture encoding apparatus 1 is encoded, it is possible to execute prediction using any one component among the R, G, and B components. In this way, when the prediction is executed using any one component, there is a possibility of an adverse influence given to a prediction result in the RGB format due to a difference in signal characteristics between the YCgCo format and the RGB format. That is, in a case in which the prediction is executed with the Y component where information of a video is concentrated and a case in which the prediction is executed with the G component among the R, G, and B components where information of a video is equally distributed, prediction using the Y component having more information is more precise than prediction using the G component.

Whether the intra frame prediction and the inter frame prediction are executed independently on each of three components of a color space or executed mainly using one component among the three components is designated by a flag "separate_colour_plane_flag" present in a sequence parameter set (SPS) header. In a case of "separate_colour_plane_flag=1", the moving picture encoding apparatus 1 executes the intra frame prediction and the inter frame prediction independently on each of the three components of the color space. Conversely, in a case of ""separate_colour_plane_flag=0", the moving picture encoding apparatus 1 executes the intra frame prediction and the inter frame prediction mainly using any one component (for example, the G component) among the three components of the color space. In other words, the intra frame prediction and the inter frame prediction in the case of "separate_colour_plane_flag=0" are prediction in which the three components in the color space format are not independently predicted and which is executed focusing on any one component (for example, the G component) among the three components of the color space. In the following description, the intra frame prediction and the inter frame prediction in the case of "separate_colour_plane_flag=0" are also expressed as prediction which is predicted using any one component among the three components of the color space in some cases.

In this way, in a case in which moving picture data is input with the RGB format and any one component is used among three components R, G, and B for prediction, there is a possibility of precision of a motion vector in the inter prediction being lowered. For example, in a case in which each of the three components R, G, and B has meaningful information, the meaningful information of the other two components is not usable for prediction when the prediction is executed using only any one component. Therefore, there is a possibility of the prediction precision deteriorating.

Conversely, when prediction is executed using not only one component (for example, the G component) but also all of the components R, G, and B, the prediction precision becomes better. However, another problem occurs in that a calculation processing amount increases according to the number of pixels to be used for the prediction. Specifically, when prediction is executed using three components, a processing amount increases three times at the time of a 4:4:4 format, increases twice at the time of a 4:2:2 format, and increases 1.25 times at the time of a 4:2:0 format, compared to a processing amount of a case in which prediction is executed using one component.

Figure 2:
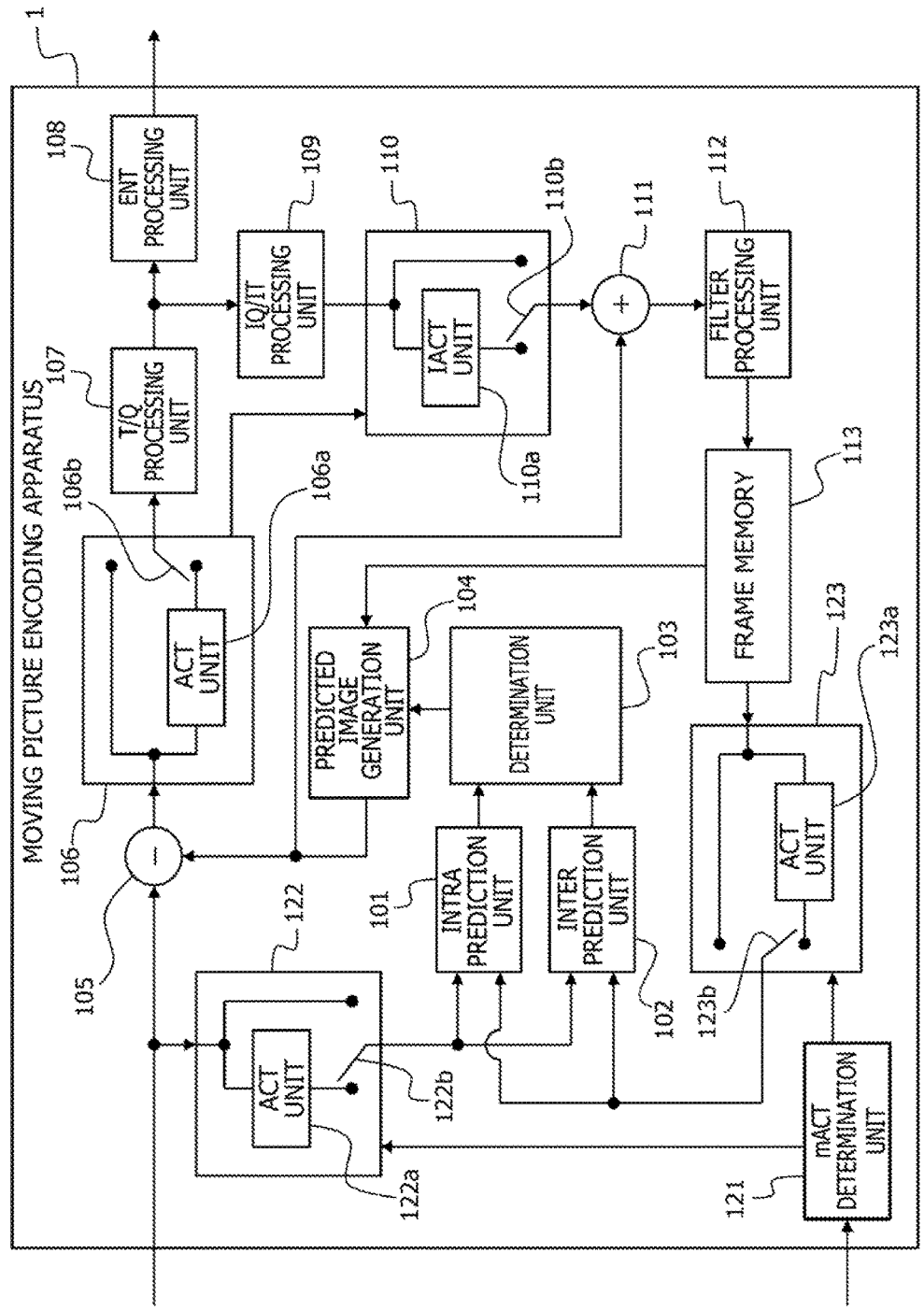
FIG. 2 is a diagram illustrating a functional configuration of a moving picture encoding apparatus according to a first embodiment.

FIG. 2 is a diagram illustrating a functional configuration of a moving picture encoding apparatus according to a first embodiment.

As illustrated in FIG. 2, a moving picture encoding apparatus 1 according to the present embodiment includes an intra prediction unit 101, an inter prediction unit 102, a determination unit 103, a predicted image generation unit 104, and a prediction error signal generation unit 105. The moving picture encoding apparatus 1 includes a first color space selection unit 106, a T/Q processing unit 107, and an ENT processing unit 108. The moving picture encoding apparatus 1 further includes an IQ/IT processing unit 109, a color space restoration unit 110, a decoded image generation unit 111, a filter processing unit 112, and a frame memory 113. The moving picture encoding apparatus 1 according to the present embodiment further includes an mACT determination unit 121, a second color space selection unit 122, and a third color space selection unit 123.

The intra prediction unit 101, the inter prediction unit 102, the determination unit 103, the predicted image generation unit 104, and the prediction error signal generation unit 105 in the moving picture encoding apparatus 1 according to the present embodiment have the foregoing respective functions. The first color space selection unit 106 in the moving picture encoding apparatus 1 has the same function as the foregoing first color space selection unit 106 (see FIG. 1). The T/Q processing unit 107, the ENT processing unit 108, the IQ/IT processing unit 109, the color space restoration unit 110, the decoded image generation unit 111, the filter processing unit 112, and the frame memory 113 in the moving picture encoding apparatus 1 have the foregoing respective functions.

The mACT determination unit 121 determines which image data with either the RGB format or the YUV format is used for prediction based on, for example, the degree of deviation in information regarding the RGB components in a current processing target frame. In the following description, in a case in which image data with the RGB format is used for prediction of the intra prediction unit 101 and the inter prediction unit 102, mACT is assumed to be turned off. In a case in which image data with the YUV format is used in the prediction, the mACT is assumed to be turned on. The mACT determination unit 121 outputs an ON/OFF determination result of the mACT to the second color space selection unit 122 and the third color space selection unit 123. In a case in which the mACT is turned on, the mACT determination unit 121 outputs, for example, a signal called "mACT=1" to the second color space selection unit 122 and the third color space selection unit 123. Conversely, in a case in which the mACT is turned off, the mACT determination unit 121 outputs, for example, a signal called "mACT=0" to the second color space selection unit 122 and the third color space selection unit 123.

Only in a case in which moving picture data input to the moving picture encoding apparatus 1 has the RGB format, the mACT determination unit 121 determines which image with either the RGB format or the YUV format is used for prediction. That is, in a case in which the moving picture data input to the moving picture encoding apparatus 1 has the YUV format, the mACT determination unit 121 determines that an image with the YUV format is used for prediction (sets the mACT to be turned on).

Based on a determination result of the mACT determination unit 121, the second color space selection unit 122 selects a color space of the original image data to be input to the intra prediction unit 101 and the inter prediction unit 102. The second color space selection unit 122 includes an ACT unit 122a and a switch 122b. The ACT unit 122a transforms the color space of the original image data from the RGB format to the YCgCo format. Whether the original image data with the RGB format input to the second color space selection unit 122 is output while maintaining the RGB format or the original image data with the RGB format is transformed into the YCgCo format by the ACT unit 122a is switched by the switch 122b. In the case in which the mACT is turned off, the second color space selection unit 122 switches the switch 122b so that the input original image data is output while maintaining the RGB format. Conversely, in the case in which the mACT is turned on, the second color space selection unit 122 switches the switch 122b so that the original image data transformed into the YCgCo format by the ACT unit 122a is output.

Based on the determination result of the mACT determination unit 121, the third color space selection unit 123 selects a color space of reference image data to be input to the intra prediction unit 101 and the inter prediction unit 102. The third color space selection unit 123 includes an ACT unit 123a and a switch 123b. The ACT unit 123a transforms the color space of the reference image data from the RGB format into the YCgCo format. Whether the reference image data with the RGB format input to the third color space selection unit 123 is output while maintaining the RGB format or the reference image data with the RGB format is transformed into the YCgCo format by the ACT unit 123a is switched by the switch 123b. In the case in which the mACT is turned off, the third color space selection unit 123 switches the switch 123b so that the input reference image data is output while maintaining the RGB format. Conversely, in the case in which the mACT is turned on, the third color space selection unit 123 switches the switch 123b so that the reference image data transformed into the YCgCo format by the ACT unit 123a is output.

Each of the ACT unit 122a of the second color space selection unit 122 and the ACT unit 123a of the third color space selection unit 123 calculates values of the components Y, Cg, and Co from values of the components R, G, and B of the image data by executing inverse transform of Equation (1).

Figure 3:
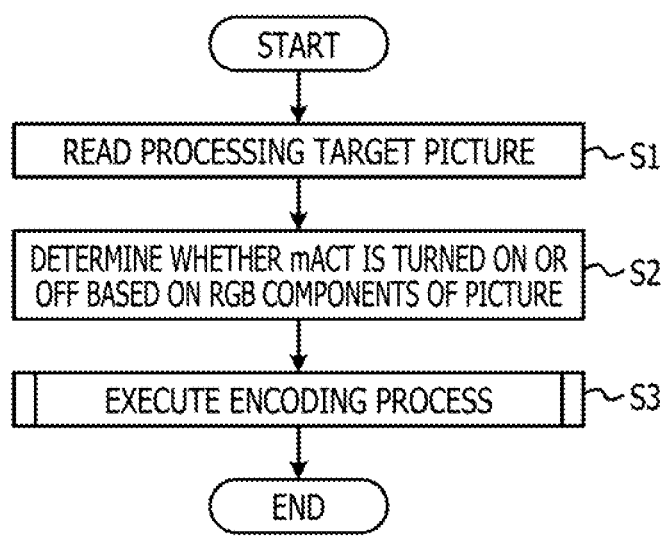
FIG. 3 is a flowchart illustrating an encoding process for one picture according to the first embodiment.

FIG. 3 is a flowchart illustrating an encoding process for one picture according to the first embodiment. FIG. 3 illustrates a flowchart of an encoding process in a case in which a picture with the RGB format is input and one component is mainly used among three components of a color space for prediction. The determination of whether the input picture has the RGB format is executed by, for example, an overall control unit (not illustrated in FIG. 2) that controls an overall operation of the moving picture encoding apparatus 1. The overall control unit determines whether a picture with the RGB format is encoded base on, for example, a flag "residual_adaptive_colour_transform_enabled_flag" or a tone mapping SEI (header information). Based on a value of the flag "separate_colour_plane_flag", the overall control unit determines whether prediction is executed using mainly one component among three components of a color space.

In a case in which the prediction is executed on an input picture with the RGB format using one component among three components of a color space, the moving picture encoding apparatus 1 reads a preferential processing target picture, as illustrated in FIG. 3 (step S1). Then, based on the RGB components of the read picture, it is determined whether the mACT is turned on or off (step S2). The steps S1 and S2 are executed by the mACT determination unit 121. The mACT determination unit 121 outputs a determination result of step S2 to the second color space selection unit 122 and the third color space selection unit 123.

Thereafter, the moving picture encoding apparatus 1 executes an encoding process (step S3) on the processing target picture. In a case in which the prediction is executed on the input picture with the RGB format mainly using one component among three components of the color space, the moving picture encoding apparatus 1 according to the present embodiment executes, for example, the same process as a process illustrated in FIG. 4 as the encoding process of step 3.

Figure 4:
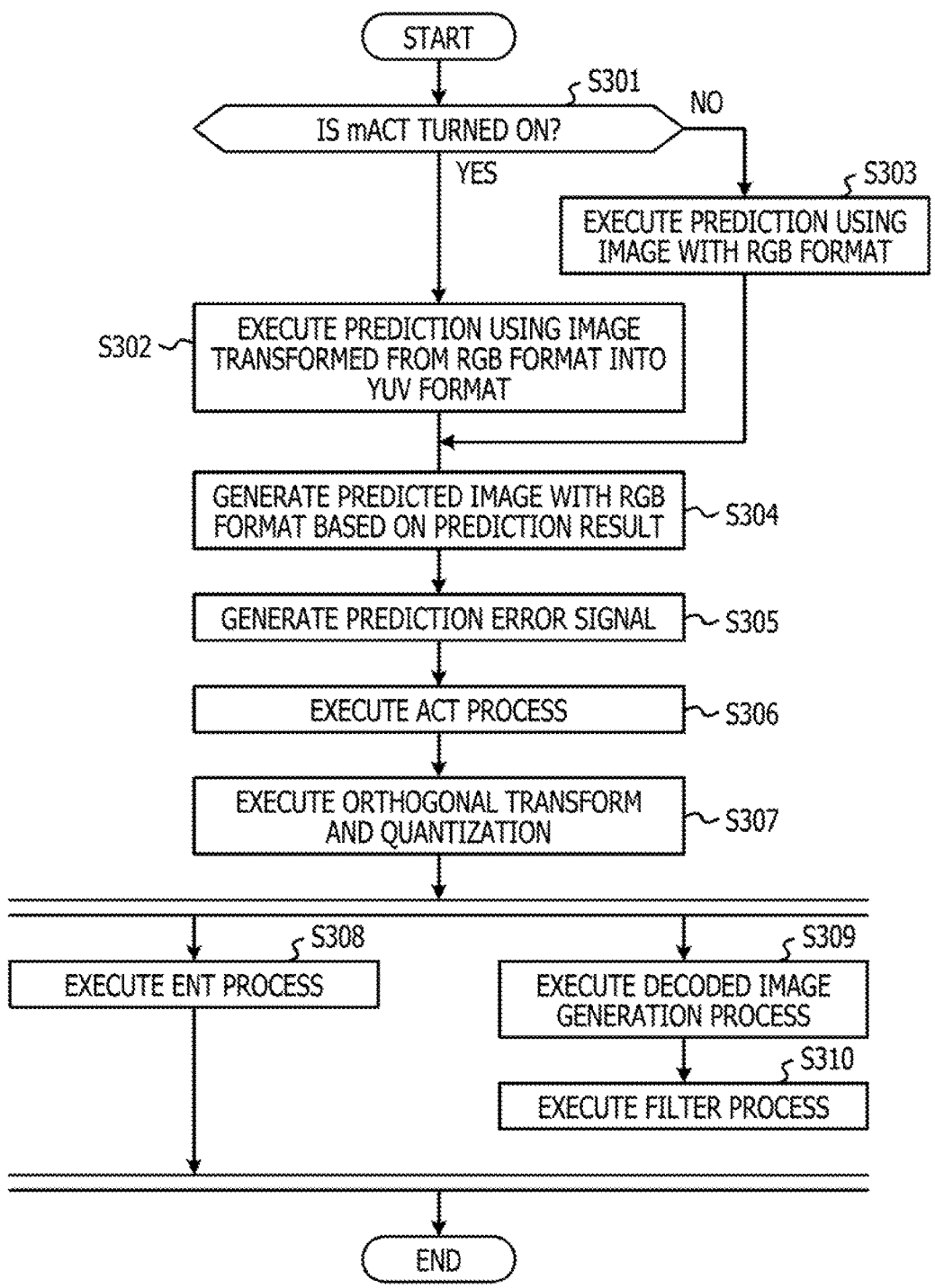
FIG. 4 is a flowchart illustrating an encoding process for a picture with the RGB format.

FIG. 4 is a flowchart illustrating an encoding process for a picture with the RGB format.

In the encoding process (step S3) on the picture with the RGB format, as illustrated in FIG. 4, it is first determined whether the mACT is turned on (step S301). The second color space selection unit 122 and the third color space selection unit 123 execute step S301. In the case in which the mACT is turned on (Yes in step S301), the second color space selection unit 122 and the third color space selection unit 123 cause the intra prediction unit 101, the inter prediction unit 102, and the determination unit 103 to execute prediction using an image with the YUV format (step S302). That is, in the case in which the mACT is turned on, the second color space selection unit 122 switches the switch 122b so that the original image data input to the moving picture encoding apparatus 1 is input to the intra prediction unit 101 and the inter prediction unit 102 via the ACT unit 122a. In the case in which the mACT is turned on, the third color space selection unit 123 switches the switch 123b so that the reference image data of the frame memory 113 is input to the intra prediction unit 101 and the inter prediction unit 102 via the ACT unit 123a. Accordingly, the original image data and the reference image data transformed into the YCgCo format are input to each of the intra prediction unit 101 and the inter prediction unit 102. Thus, each of the intra prediction unit 101 and the inter prediction unit 102 executes prediction using the original image data and the reference image data transformed into the YCgCo format.

In the process of step S302, the intra prediction unit 101 and the inter prediction unit 102 execute the prediction based on the prediction block (PU) unit set in the processing block (CU). In a case in which one CU is segmented into a plurality of PUs, each of the intra prediction unit 101 and the inter prediction unit 102 executes the prediction on each PU in a Z scan order. When the intra prediction unit 101 and the inter prediction unit 102 end the prediction on one processing block, the intra prediction unit 101 and the inter prediction unit 102 output the prediction result to the determination unit 103. The determination unit 103 determines a prediction result (predicted image) in which an encoding cost is the minimum based on the prediction results of the intra prediction unit 101 and the inter prediction unit 102. The determination unit 103 outputs the determination result, that is, the prediction result in which the encoding cost is the minimum, to the predicted image generation unit 104. In this way, the prediction process of step S302 on one processing block (CU) ends. Conversely, in the case in which the mACT is turned off (No in step S301), the second color space selection unit 122 and the third color space selection unit 123 cause the intra prediction unit 101, the inter prediction unit 102, and the determination unit 103 to execute the prediction using the image with the RGB format (step S303). That is, in the case in which the mACT is turned off, the second color space selection unit 122 switches the switch 122b so that the original image data input to the moving picture encoding apparatus 1 is input to the intra prediction unit 101 and the inter prediction unit 102 without passing through the ACT unit 122a. In the case in which the mACT is turned off, the third color space selection unit 123 switches the switch 123b so that the reference image data of the frame memory 113 is input to the intra prediction unit 101 and the inter prediction unit 102 without passing through the ACT unit 123a. Accordingly, the original image data and the reference image data with the RGB format are input to each of the intra prediction unit 101 and the inter prediction unit 102. Thus, each of the intra prediction unit 101 and the inter prediction unit 102 executes the prediction using the original image data and the reference image data with the RGB format.

Even in the process of step S303, the intra prediction unit 101 and the inter prediction unit 102 output the prediction result to the determination unit 103 when ending the prediction on one processing block. The determination unit 103 determines a prediction result (predicted image) in which the encoding cost is the minimum based on the prediction results of the intra prediction unit 101 and the inter prediction unit 102. The determination unit 103 outputs the prediction result, that is, the prediction result in which the encoding cost is the minimum, to the predicted image generation unit 104. Accordingly, the prediction process of step S303 on one processing block (CU) ends.

When the prediction process of step S302 or S303 ends, the predicted image generation unit 104 subsequently generates a predicted image with the RGB format based on the prediction result (step S304). In the case in which the mACT is turned off, each of the intra prediction unit 101 and the inter prediction unit 102 executes the prediction using image data with the RGB format. Therefore, in the case in which the mACT is turned off, the predicted image generation unit 104 generates the predicted image using, for example, the reference image data with the RGB format input from the intra prediction unit 101 or the inter prediction unit 102 via the determination unit 103. Conversely, in the case in which the mACT is turned on, each of the intra prediction unit 101 and the inter prediction unit 102 executes the prediction using the image data with the YCgCo. Therefore, in the case in which the mACT is turned on, the predicted image generation unit 104 reads the image data with the RGB format corresponding to the prediction result in which the encoding cost is the minimum from the frame memory 113 and generates the predicted image. The predicted image generation unit 104 outputs the generated predicted image to the prediction error signal generation unit 105. The predicted image is also used when a local decoded image is generated. Therefore, the predicted image generated by the predicted image generation unit 104 is output to the prediction error signal generation unit 105 and is also stored in, for example, a buffer included in the decoded image generation unit 111 or the like.

After the predicted image is generated, the prediction error signal generation unit 105 in the moving picture encoding apparatus 1 generates a prediction error signal (step S305). The prediction error signal generation unit 105 obtains a difference between the predicted image and the original image data in regard to the processing block (CU) and outputs the difference as a prediction error signal to the first color space selection unit 106. The prediction error signal generation unit 105 generates the prediction error signal with the RGB format using the original image data and the predicted image with the RGB format. Therefore, the prediction error signal with the RGB format is input to the first color space selection unit 106.

After the prediction error signal is generated, the first color space selection unit 106 in the moving picture encoding apparatus 1 executes the ACT process (step S306). The first color space selection unit 106 determines whether the prediction error signal is output to the T/Q processing unit 107 while maintaining the RGB format or the prediction error signal is transformed into the YCgCo format and is output to the T/Q processing unit 107 for each transform block (TU) set in the processing block (CU). Which prediction error signal with either the RGB format or the YCgCo format is output to the T/Q processing unit 107 is determined based on, for example, a control signal from the overall control unit (not illustrated in FIG. 2). In a case in which the prediction error signal is output to the T/Q processing unit 107 while maintaining the RGB format, the first color space selection unit 106 switches the switch 106b so that the prediction error signal from the prediction error signal generation unit 105 is input to the T/Q processing unit 107 without passing through the ACT unit 106a. Conversely, in a case in which the prediction error signal is transformed into the YCgCo format and is output to the T/Q processing unit 107, the first color space selection unit 106 switches the switch 106b so that the prediction error signal from the prediction error signal generation unit 105 is input to the T/Q processing unit 107 via the ACT unit 106a. The ACT unit 106a transforms the prediction error signal from the RGB format to the YCgCo format through the inverse transform of Equation (1). When the ACT process on one processing block ends, the first color space selection unit 106 stores color space information regarding each transform block to, for example, a buffer (not illustrated) included in the color space restoration unit 110 or the like.

When the prediction error signal is input to the T/Q processing unit 107 through the ACT process executed by the first color space selection unit 106, the T/Q processing unit 107 executes the orthogonal transform and the quantization based on the transform block (TU) unit (step S307). The T/Q processing unit 107 determines whether the transform block has either the RGB format or the YCgCo format and executes the orthogonal transform and the quantization corresponding to each format. A value (transform coefficient) quantized by the T/Q processing unit 107 is output to the ENT processing unit 108. When the transform coefficient quantized by the T/Q processing unit 107 is input, the ENT processing unit 108 executes an ENT process of executing arithmetic encoding or entropy encoding on the input transform coefficient to generate a bit stream (step S308).

The transform coefficient quantized by the T/Q processing unit 107 is also used to generate a reference image (local decoded image) at the time of encoding of a subsequent processing block or picture. That is, after the orthogonal transform and the quantization of step S307 are executed, the moving picture encoding apparatus 1 executes the ENT process and also executes a decoded image generation process (step S309) and a filter process (step S310). The decoded image generation process of step S309 is executed by the IQ/IT processing unit 109, the color space restoration unit 110, and the decoded image generation unit 111. The filter process of step S310 is executed by the filter processing unit 112.

In the decoded image generation process of step S309, the IQ/IT processing unit 109 executes the orthogonal transform and the quantization on the transform coefficient quantized by the T/Q processing unit 107 to restore the prediction error image before the execution of the orthogonal transform. Next, the color space restoration unit 110 executes inverse transform on the transform block with the YCgCo format in the RGB format based on ON/OFF information of the ACT in regard to each transform block (TU) in the prediction error image (processing block) to restore the prediction error signal with the RGB format. Thereafter, the decoded image generation unit 111 generates a decoded image with the RGB format in regard to the original image data using the prediction error signal restored in the RGB format and the predicted image generated by the predicted image generation unit 104.

In the filter process of step S310, for example, the filter processing unit 112 executes a deblocking filter process on the decoded image generated by the decoded image generation unit 111. In a case in which a moving picture is encoded in conformity with the H.265/HEVC standard, for example, the filter processing unit 112 continuously executes the SAO process after the deblocking filter process. When the predetermined filter process on the decoded image ends, the filter processing unit 112 stores the decoded image subjected to the filter process in the frame memory 113. Accordingly, the encoding process on one processing block ends in the moving picture encoding apparatus 1.

In the moving picture encoding apparatus 1, the processes of steps S301 to S310 are sequentially executed on each of the plurality of processing blocks set in one picture. At this time, the moving picture encoding apparatus 1 executes the processes of steps S301 to S310 on each processing block in a pipeline way.

In this way, in a case in which the picture with the RGB format is input and the prediction is executed mainly using one component among three components of the color space, which image with either the RGB format or the YCgCo format is used for the prediction is determined in the process of encoding the moving picture according to the present embodiment.

In the YUV format including the YCgCo format, meaningful information of the image data is concentrated on the luminance signal Y. Therefore, for example, excluding a case in which the meaningful information is concentrated on one of the R, G, and B components in the RGB format, the prediction can be executed with higher precision when the prediction is executed while maintaining the RGB format than when the prediction is executed by transforming the RGB format into the YCgCo format.

As described above, it is better to execute the prediction while maintaining the RGB format, for example, in a case in which the meaningful information is concentrated on one of the R, G, and B components in the RGB format. For example, in a case in which the meaningful information in the picture with the RGB format is concentrated on the G component, information (signal) regarding the G component disperses to three signals, the luminance signal Y, the color difference signal Cg of the green component, and the color difference signal Co of the orange component when the picture is transformed into the YCgCo format. Therefore, meaningful information included in the luminance signal Y important in the YUV format is small, and thus there is a low possibility of the prediction precision being lower than in a case in which the prediction is executed while maintaining the RGB format. Accordingly, in the moving picture encoding apparatus 1 according to the present embodiment, the mACT determination unit 121 determines which format is used between the RGB format and the YCgCo format to execute the prediction with higher precision. Hereinafter, a method of determining which format is used between the RGB format and the YCgCo format by the mACT determination unit 121 for the prediction, that is, a method of determining whether the mACT is turned on or off in step S2, will be described with reference to FIG. 5.

Figure 5:
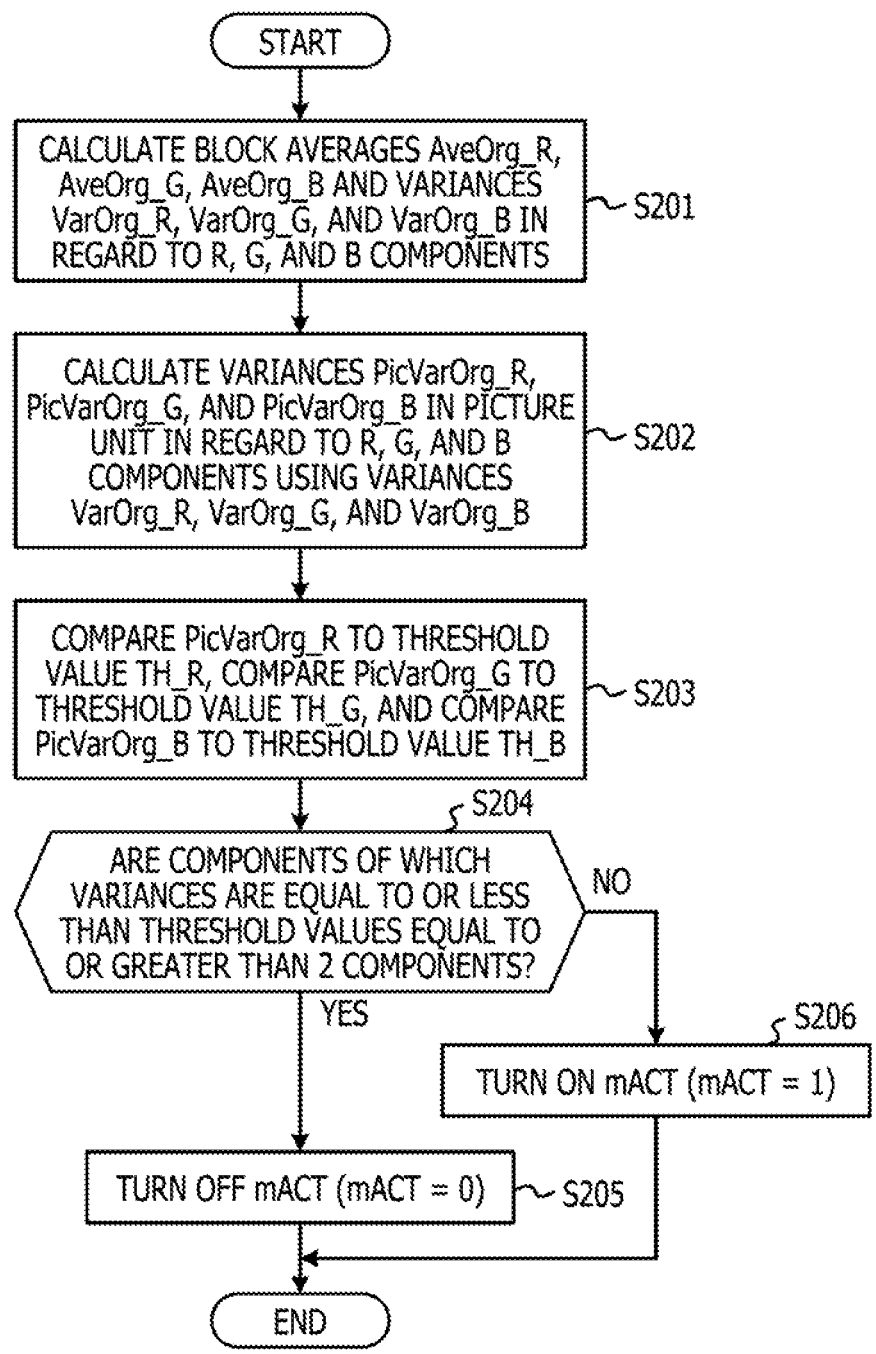
FIG. 5 is a flowchart illustrating a method of determining whether mACT is turned on or off.

FIG. 5 is a flowchart illustrating a method of determining whether the mACT is turned on or off.

After reading a processing target picture, the mACT determination unit 121 first calculates block averages AveOrg_R, AveOrg_G, and AveOrg_B and variances VarOrg_R, VarOrg_G, and VarOrg_B in regard to the R, G, and B components, as illustrated in FIG. 5 (step S201). In step S201, the mACT determination unit 121 calculates a block average AveOrg_G and a variance VarOrg_G in regard to the G component using, for example, the following Equations (2-1) and (2-2).

$$AveOrg\_G = \frac{1}{N}\sum_{i=1}^{N} Org\_G[i] \quad (2\text{-}1)$$

$$VarOrg\_G = \frac{1}{N}\sum_{i=1}^{N} (Org\_G[i] - AveOrg\_G) \quad (2\text{-}2)$$

In Equations (2-1) and (2-2), N indicates a total number of pixels in a block and i indicates a variable indicating a pixel in the block. In Equations (2-1) and (2-2), Org_G[i] indicates a pixel value of the G component of an i-th pixel in an original image.

In step S201, the mACT determination unit 121 calculates the block average AveOrg_R and the variance VarOrg_R of the R component, the block average AveOrg_B and the variance VarOrg_B of the B component using the same equations as Equations (2-1) and (2-2).

Next, the mACT determination unit 121 calculates variances PicVarOrg_R, PicVarOrg_G, and PicVarOrg_B in the picture unit in regard to the R, G, and B components (step S202). In step S202, the mACT determination unit 121 calculates, for example, a variance PicVarOrg_G in the picture unit in regard to the G component using the following Equation (3).

$$PicVarOrg\_G = \frac{1}{M}\sum_{j=1}^{M} VarOrg\_G[j] \quad (3)$$

In Equation (3), M indicates the number of blocks in a picture and j indicates a variable representing a block in the picture.

In step S202, the mACT determination unit 121 calculates the variances PicVarOrg_R and PicVarOrg_B in the picture unit in regard to the R and B components using the same equation as Equation (3).

Next, the mACT determination unit 121 determines whether the mACT is turned on or off based on the variances PicVarOrg_R, PicVarOrg_G, and PicVarOrg_B in the picture unit in regard to the R, G, and B components calculated in step S202 (step S203). In step S203, as illustrated in FIG. 5, for example, using determination threshold values TH_R, TH_G, and TH_B of the R, G, and B components, the mACT determination unit 121 determines that the mACT is turned off in a case in which the variances of two or more components among the variances PicVarOrg_R, PicVarOrg_G, and PicVarOrg_B of three components are less than the determination threshold values.

As described above, in a case in which the prediction is executed mainly using one component among the three components in the picture input with the RGB format, the mACT determination unit 121 determines whether the prediction is executed while maintaining the RGB format or the prediction is executed by transforming the RGB format into the YCgCo format. Excluding a case in which the meaningful information is concentrated on one of the R, G, and B components in the picture with the RGB format, the prediction can be executed with higher precision when the prediction is executed while maintaining the RGB format than when the prediction is executed by transforming the RGB format into the YCgCo format.

On the other hand, since the transform of the RGB format into the YCgCo format is calculation using a 3×3 matrix, transform calculation on one pixel can be realized by multiplication of three times and addition of three times. In practice, a calculation amount is increased twice since the transform process is executed on the original image data and the transform process is executed on the reference image data at the time of the prediction. Additionally, since the calculation amount is further increased about twice by executing the inverse transform from the YCgCo format to the RGB format, the calculation amount per one pixel is about multiplication of 12 times and addition of 8 times. This can be said to be a process in which the calculation amount is slighter than a calculation amount of difference absolute value calculation or difference square calculation corresponding to the number of search points per pixel in motion search in which several tens of points or several thousands of points are searched, or a calculation amount of a sub-pel filter process executed at the time of sub-pel search.

Accordingly, in the moving picture encoding according to the present embodiment, it is possible to execute the prediction with high precision while suppressing an increase in a calculation amount when a picture with the RGB format is encoded.

The YCgCo format exemplified in the present embodiment is merely an example of the YUV format for which the complete reversible transform with the RGB format is possible. The RGB format may be transformed into another YUV format as long as complete reversible transform or substantial complete reversible transform with the RGB format is possible.

Whether the mACT according to the present embodiment is determined to be turned on or off may be executed based on another value without being limited to the variances in the picture unit of the R, G, and B components in the processing target picture.

In the present embodiment, the example of the encoding process in the case in which the picture with the RGB format is input has been described. However, the moving picture encoding apparatus 1 according to the present embodiment can also encode a picture with the YUV format. In a case in which a picture with the YUV format is input, the moving picture encoding apparatus 1 executes an existing encoding process on image data with the YUV format. At this time, as described above, the mACT determination unit 121 determines that the prediction is executed in the YUV format (the mACT is turned on), and the second color space selection unit 122 and the third color space selection unit 123 input the image data of the YUV format to the intra prediction unit 101 and the inter prediction unit 102.

Figure 6:
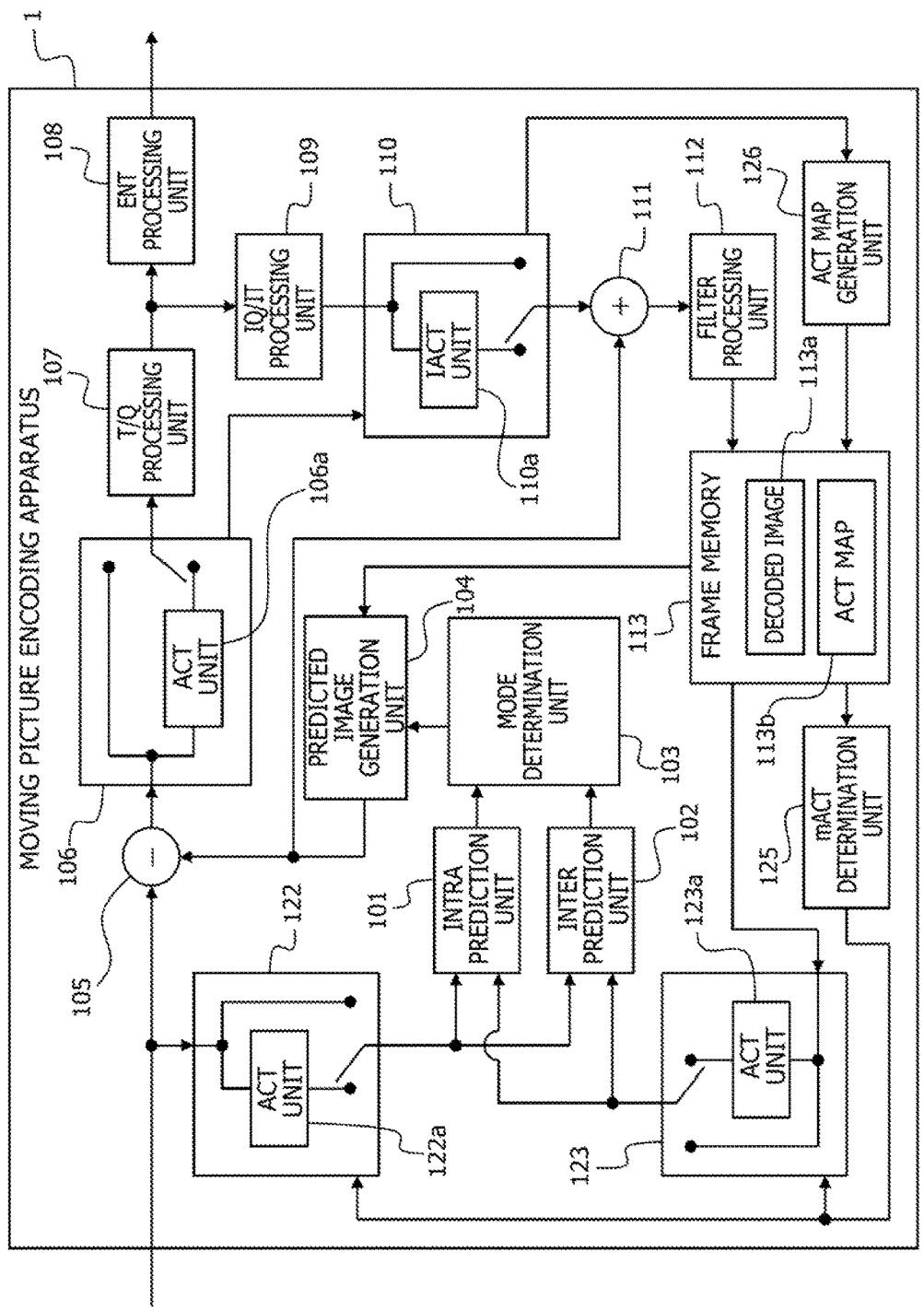
FIG. 6 is a diagram illustrating a functional configuration of a moving picture encoding apparatus according to a second embodiment.

FIG. 6 is a diagram illustrating a functional configuration of a moving picture encoding apparatus according to a second embodiment.

As illustrated in FIG. 6, a moving picture encoding apparatus 1 according to the present embodiment includes an intra prediction unit 101, an inter prediction unit 102, a determination unit 103, a predicted image generation unit 104, and a prediction error signal generation unit 105. The moving picture encoding apparatus 1 includes a first color space selection unit 106, a T/Q processing unit 107, and an ENT processing unit 108. The moving picture encoding apparatus 1 further includes an IQ/IT processing unit 109, a color space restoration unit 110, a decoded image generation unit 111, a filter processing unit 112, and a frame memory 113. The moving picture encoding apparatus 1 according to the present embodiment further includes an mACT determination unit 125, a second color space selection unit 122, a third color space selection unit 123, and an ACT map generation unit 126.

The intra prediction unit 101, the inter prediction unit 102, the determination unit 103, the predicted image generation unit 104, and the prediction error signal generation unit 105 in the moving picture encoding apparatus 1 according to the present embodiment have the foregoing respective functions. The first color space selection unit 106 in the moving picture encoding apparatus 1 has the same function as the foregoing first color space selection unit 106 (see FIG. 1). The T/Q processing unit 107, the ENT processing unit 108, the IQ/IT processing unit 109, the color space restoration unit 110, the decoded image generation unit 111, the filter processing unit 112, and the frame memory 113 in the moving picture encoding apparatus 1 have the foregoing respective functions. The frame memory 113 stores an ACT map 113b generated by the ACT map generation unit 126 in addition to a decoded image 113a decoded from the quantized transform coefficient.

The mACT determination unit 125 of the moving picture encoding apparatus 1 according to the present embodiment determines which image with either the RGB format or the YUV (YCgCo) format is used for prediction, in other words, determines whether the ACT (mACT) for prediction is turned on or off. The mACT determination unit 125 determines whether the mACT is turned on or off based on an ACT map stored in the frame memory 113. The mACT determination unit 125 outputs an ON/OFF determination result of the mACT to the second color space selection unit 122 and the third color space selection unit 123. In a case in which the mACT is turned on, the mACT determination unit 125 outputs, for example, a signal called "mACT=1" to the second color space selection unit 122 and the third color space selection unit 123. Conversely, in a case in which the mACT is turned off, the mACT determination unit 125 outputs, for example, a signal called "mACT=0" to the second color space selection unit 122 and the third color space selection unit 123.

In a case in which a picture (moving picture data) input to the moving picture encoding apparatus 1 has the RGB format and the prediction is executed mainly using one component among three components, the mACT determination unit 125 determines which image data with either the RGB format or the YUV (YCgCo) format is used for prediction. That is, in a case in which the picture input to the moving picture encoding apparatus 1 has the YUV format, the mACT determination unit 125 determines that the prediction is executed using the image data with the YUV format (determines that the mACT is turned on). The mACT determination unit 125 determines whether the input moving picture data has the RGB format or the YUV format by a control signal from an overall control unit (not illustrated in FIG. 6) that controls an overall operation of the moving picture encoding apparatus 1.

The second color space selection unit 122 selects a color space of original image data input to the intra prediction unit 101 and the inter prediction unit 102 based on a determination result of the mACT determination unit 125. The second color space selection unit 122 includes an ACT unit 122a and a switch (not illustrated). The ACT unit 122a transforms the color space of the original image data from the RGB format to the YCgCo format. Whether the original image data with the RGB format input to the second color space selection unit 122 is output while maintaining the RGB format or the original image data with the RGB format is transformed into the YCgCo format by the ACT unit 122a is switched by the switch.

Based on the determination result of the mACT determination unit 125, the third color space selection unit 123 selects a color space of reference image data to be input to the intra prediction unit 101 and the inter prediction unit 102. The third color space selection unit 123 includes an ACT unit 123a and a switch (not illustrated). The ACT unit 123a transforms the color space of the reference image data from the RGB format into the YCgCo format. Whether the reference image data with the RGB format input to the third color space selection unit 123 is output while maintaining the RGB format or the reference image data with the RGB format is transformed into the YCgCo format by the ACT unit 123a is switched by the switch 123b.

Each of the ACT unit 122a of the second color space selection unit 122 and the ACT unit 123a of the third color space selection unit 123 calculates values of the components Y, Cg, and Co from values of the components R, G, and B of the image data by executing inverse transform of Equation (1).

The ACT map generation unit 126 generates an ACT map including screen position information and the number of counts by counting whether encoding (orthogonal transform and quantization) is executed using a one process between ACT ON and ACT OFF for each picture.

Figure 7A:
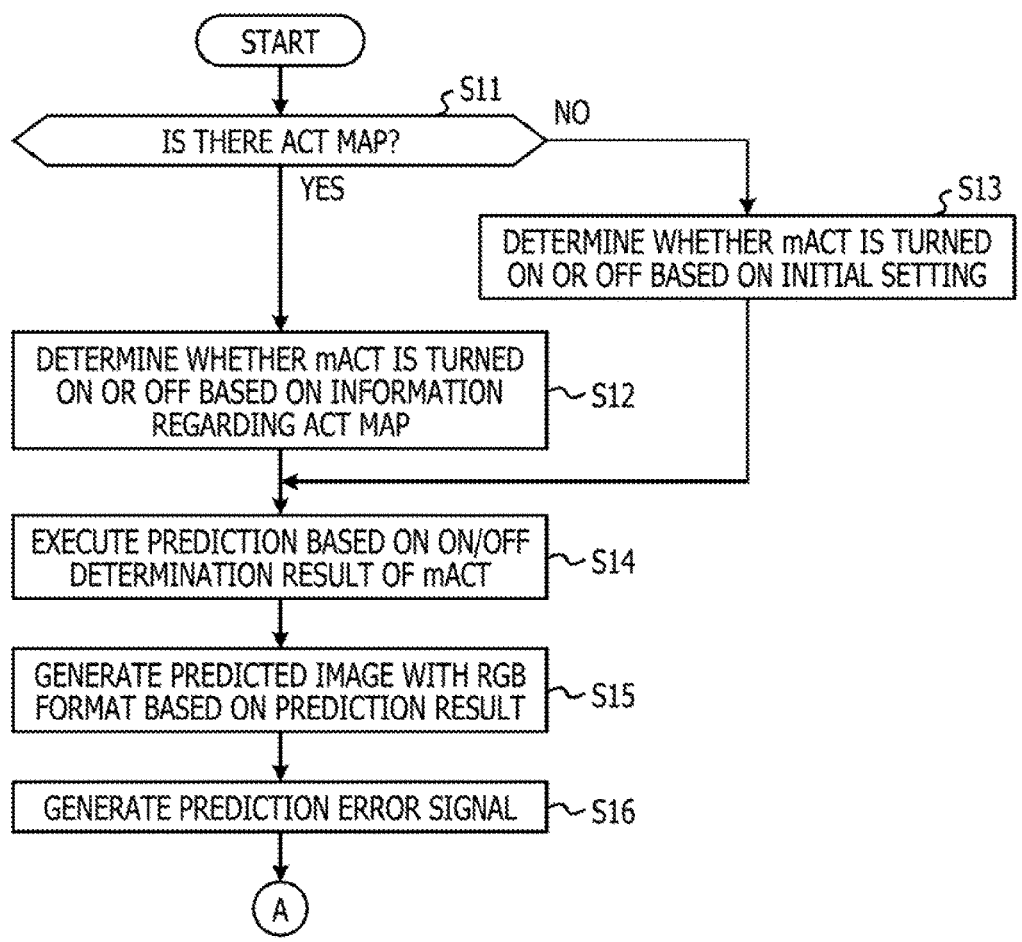
FIG. 7A is a flowchart (part 1) illustrating an encoding process according to the second embodiment.
Figure 7B:
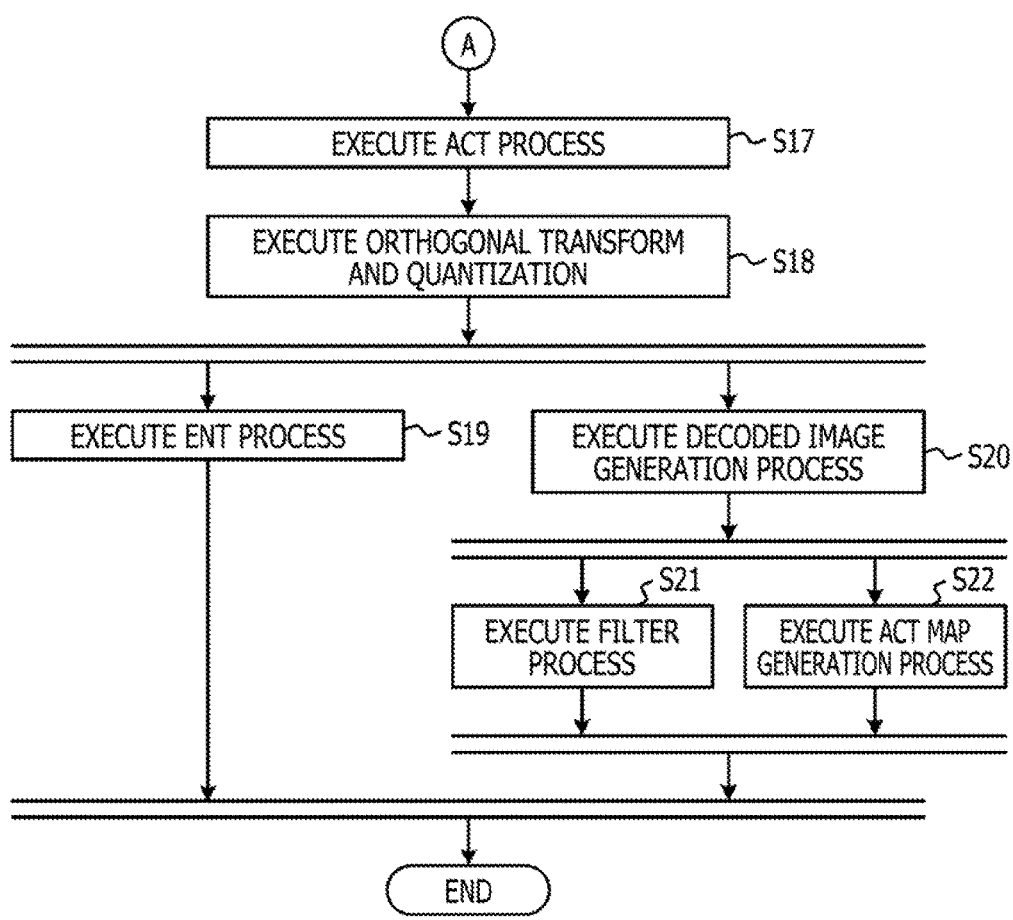
FIG. 7B is a flowchart (part 2) illustrating the encoding process according to the second embodiment.

FIG. 7A is a flowchart (part 1) illustrating an encoding process according to the second embodiment. FIG. 7B is a flowchart (part 2) illustrating the encoding process according to the second embodiment. FIGS. 7A and 7B illustrate flowcharts of an encoding process on one processing block in a case in which the picture (the original image data) with the RGB format is input and the prediction is executed mainly using one component among three components of the color space. The prediction executed using mainly one component among three components of the color space is prediction of a case in which a flag "separate_colour_plane_flag" present in the SPS header is "separate_colour_plane_flag=0", as described in the first embodiment. For example, the overall control unit (not illustrated in FIG. 6) controlling an overall operation of the moving picture encoding apparatus 1 determines whether the input picture has the RGB format. The overall control unit determines whether the prediction is executed mainly using one component among three components, for example, by a value of the flag "separate_colour_plane_flag".

In a case in which the prediction is executed on the input picture with the RGB format mainly using one component among three components of the color space, the moving picture encoding apparatus 1 first determines whether there is the ACT map usable for the ON/FF determination of the mACT, as illustrated in FIG. 7A (step S11). The mACT determination unit 125 executes step S11. In a case in which there is the ACT map usable for the determination (Yes in step S11), the mACT determination unit 125 determines whether the mACT is turned on or off based on the ACT map (step S12). Conversely, in a case in which there is no ACT map usable for the determination (No in step S11), the mACT determination unit 125 determines whether the mACT is turned on or off based on initial setting (step S13). The mACT determination unit 125 outputs the determination result of step S12 or S13 to the second color space selection unit 122 and the third color space selection unit 123. The initial setting in the determination of step S13 is, for example, setting in which the mACT is normally turned on or setting in which the determination is executed using variances or the like of the RGB components, as in the first embodiment.

Thereafter, in the moving picture encoding apparatus 1, a prediction process is executed based on the ON/OFF determination result of the mACT (step S14). The prediction process of step S14 is executed in cooperation with the second color space selection unit 122, the third color space selection unit 123, the intra prediction unit 101, the inter prediction unit 102, and the determination unit 103. The second color space selection unit 122 and the third color space selection unit 123 switches the switch based on the ON/OFF determination result of the mACT.

In a case in which the mACT is turned on, the second color space selection unit 122 outputs the original image data transformed into the YCgCo format by the ACT unit 122a to the intra prediction unit 101 and the inter prediction unit 102. In the case in which the mACT is turned on, the third color space selection unit 123 outputs a decoded image (reference image data) read from the frame memory 113 and transformed into the YCgCo format by the ACT unit 123a to the intra prediction unit 101 and the inter prediction unit 102.

Conversely, in a case in which the mACT is turned off, the second color space selection unit 122 outputs the input original image data with the RGB format to the intra prediction unit 101 and the inter prediction unit 102, while maintaining the RGB format. In the case in which the mACT is turned on, the third color space selection unit 123 outputs the decoded image (the reference image data) with the RGB format read from the frame memory 113 to the intra prediction unit 101 and the inter prediction unit 102, while maintaining the RGB format.

Each of the intra prediction unit 101 and the inter prediction unit 102 executes the prediction using the original image data input from the second color space selection unit 122 and the reference image data input from the third color space selection unit 123. Each of the intra prediction unit 101 and the inter prediction unit 102 executes the prediction based on the prediction block (PU) unit set in the processing block (CU). When the intra prediction unit 101 and the inter prediction unit 102 end the prediction on each prediction block included in one processing block, the intra prediction unit 101 and the inter prediction unit 102 output the prediction result to the determination unit 103. The determination unit 103 determines a prediction result (predicted image) in which an encoding cost is the minimum based on the prediction results of the intra prediction unit 101 and the inter prediction unit 102. The determination unit 103 outputs the determination result, that is, the prediction result in which the encoding cost is the minimum, to the predicted image generation unit 104. Accordingly, the prediction process of step S14 on one processing block (CU) ends.

When the process of step S14 ends, the predicted image generation unit 104 subsequently generates a predicted image with the RGB format based on the prediction result (step S15). In the case in which the mACT is turned off, each of the intra prediction unit 101 and the inter prediction unit 102 executes the prediction using image data with the RGB format. Therefore, in the case in which the mACT is turned off, the predicted image generation unit 104 generates the predicted image using the reference image data with the RGB format input from the intra prediction unit 101 or the inter prediction unit 102 via the determination unit 103. Conversely, in the case in which the mACT is turned on, each of the intra prediction unit 101 and the inter prediction unit 102 executes the prediction using the image data with the YCgCo format. Therefore, in the case in which the mACT is turned on, the predicted image generation unit 104 reads the image data with the RGB format corresponding to the prediction result in which the encoding cost is the minimum from the frame memory 113 and generates the predicted image. The predicted image generation unit 104 outputs the generated predicted image to the prediction error signal generation unit 105. The predicted image is also used when a local decoded image is generated. Therefore, the predicted image generated by the predicted image generation unit 104 is output to the prediction error signal generation unit 105 and is also stored in, for example, a buffer (not illustrated) included in the decoded image generation unit 111 or the like.

After the predicted image is generated, the prediction error signal generation unit 105 in the moving picture encoding apparatus 1 generates a prediction error signal (step S16). The prediction error signal generation unit 105 obtains a difference between the predicted image and the original image data in regard to the processing block (CU) and outputs the difference as a prediction error signal to the first color space selection unit 106. The prediction error signal generation unit 105 generates the prediction error signal with the RGB format using the original image data and the predicted image with the RGB format. Therefore, the prediction error signal with the RGB format is input to the first color space selection unit 106.

After the prediction error signal is generated, as illustrated in FIG. 7B, the first color space selection unit 106 in the moving picture encoding apparatus 1 executes the ACT process (step S17). The first color space selection unit 106 determines whether the prediction error signal is output to the T/Q processing unit 107 while maintaining the RGB format or the prediction error signal is transformed into the YCgCo format and is output to the T/Q processing unit 107 for each transform block (TU) set in the processing block (CU). Which prediction error signal with either the RGB format or the YCgCo format is output to the T/Q processing unit 107 is determined based on, for example, a control signal from the overall control unit (not illustrated in FIG. 6). In a case in which the prediction error signal is output to the T/Q processing unit 107 while maintaining the RGB format, the first color space selection unit 106 switches the switch so that the prediction error signal from the prediction error signal generation unit 105 is input to the T/Q processing unit 107 without passing through the ACT unit 106a. Conversely, in a case in which the prediction error signal is transformed into the YCgCo format and is output to the T/Q processing unit 107, the first color space selection unit 106 switches the switch so that the prediction error signal from the prediction error signal generation unit 105 is input to the T/Q processing unit 107 via the ACT unit 106a. The ACT unit 106a transforms the prediction error signal from the RGB format to the YCgCo format through the inverse transform of Equation (1). When the ACT process on one processing block (CU) ends, the first color space selection unit 106 stores ON/OFF information of the ACT regarding each transform block to, for example, a buffer (not illustrated) included in the color space restoration unit 110 or the like.

When the prediction error signal is input to the T/Q processing unit 107 through the ACT process executed by the first color space selection unit 106, the T/Q processing unit 107 executes the orthogonal transform and the quantization based on the transform block (TU) unit (step S18). The T/Q processing unit 107 determines whether the transform block has either the RGB format or the YCgCo format and executes the orthogonal transform and the quantization corresponding to each format. A transform coefficient quantized by the T/Q processing unit 107 is output to the ENT processing unit 108. When the transform coefficient quantized by the T/Q processing unit 107 is input, the ENT processing unit 108 executes an ENT process of executing arithmetic encoding or entropy encoding on the input transform coefficient to generate a bit stream (step S19).

The transform coefficient quantized by the T/Q processing unit 107 is also used to generate a reference image (local decoded image) at the time of encoding of a subsequent processing block or picture. That is, after the orthogonal transform and the quantization of step S18 are executed, the moving picture encoding apparatus 1 executes the ENT process and also executes a decoded image generation process (step S20) and a filter process (step S21). The decoded image generation process of step S20 is executed by the IQ/IT processing unit 109, the color space restoration unit 110, and the decoded image generation unit 111. The filter process of step S21 is executed by the filter processing unit 112. In the decoded image generation process of step S20, the IQ/IT processing unit 109 first executes the inverse orthogonal transform and the inverse quantization on the transform coefficient quantized by the T/Q processing unit 107 to restore the prediction error image before the execution of the orthogonal transform. Next, the color space restoration unit 110 executes inverse transform on the transform block with the YCgCo format in the RGB format based on ON/OFF information of the ACT in regard to each transform block (TU) in the prediction error image (processing block) to restore the prediction error signal with the RGB format. Thereafter, the decoded image generation unit 111 generates a decoded image with the RGB format in regard to the original image data using the prediction error signal restored in the RGB format and the predicted image generated by the predicted image generation unit 104. In the filter process of step S21, for example, the filter processing unit 112 executes a filter process on the decoded image generated by the decoded image generation unit 111. In a case in which a moving picture is encoded in conformity with the H.265/HEVC standard, for example, the filter processing unit 112 continuously executes the SAO process after the deblocking filter process. When the predetermined filter process on the decoded image ends, the filter processing unit 112 stores the decoded image subjected to the filter process in the frame memory 113.

Further, in the moving picture encoding apparatus 1 according to the present embodiment generates the decoded image in step S20, and subsequently executes the ACT map generation process (step S22) along with the filter process (step S21). The ACT map generation process of step S22 is executed by the ACT map generation unit 126. The ACT map generation unit 126 generates the ACT map including screen position information and the number of counts in regard to the TU subjected to the orthogonal transform and quantization by turning on the ACT, based on the ON/OFF information of the ACT for each transform block (TU) used by the color space restoration unit 110. The ACT map generation unit 126 stores the generated ACT map in the frame memory 113. The ACT map stored in the frame memory 113 is referred to by the mACT determination unit 125 to determine whether the mACT is turned on or off at the time of execution of the subsequent processing block or picture.

As described above, the encoding process on one processing block (CU) ends in the moving picture encoding apparatus 1.

In the moving picture encoding apparatus 1, the processes of steps S11 to S22 are sequentially executed on each of the plurality of processing blocks set in one picture. At this time, the moving picture encoding apparatus 1 executes the processes of steps S11 to S22 on each processing block in a pipeline way.

Figure 8:
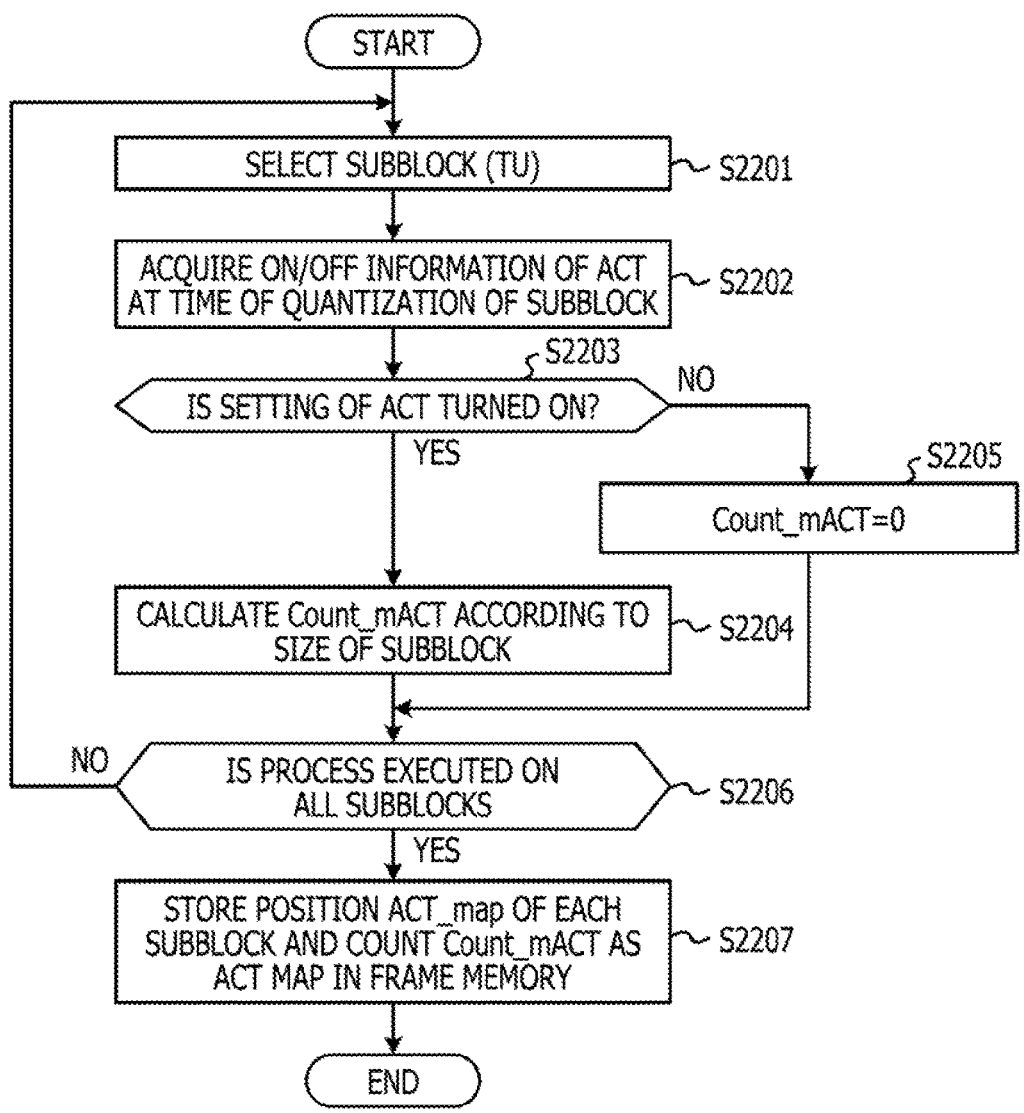
FIG. 8 is a flowchart illustrating an ACT map generation process.

FIG. 8 is a flowchart illustrating an ACT map generation process.

In the ACT map generation process of step S22, as illustrated in FIG. 8, the ACT map generation unit 126 first selects the subblock (TU) (step S2201) and acquires the ON/OFF information of the ACT at the time of quantization of the subblock (step S2202). The ACT map generation unit 126 acquires, for example, ON/OFF information of IACT in the color space restoration unit 110, that is, information indicating whether to transform the selected TU from the YCgCo format to the RGB format, as the ON/OFF information of the ACT at the time of quantization.

Next, based on the acquired ON/OFF information of the ACT, the ACT map generation unit 126 determines whether the setting of the ACT of the selected subblock is turned on (step S2203). In a case in which the setting of the ACT is turned on (Yes in step S2203), the ACT map generation unit 126 calculates a count Count_mACT according to the size of the subblock (TU) (step S2204). Conversely, in a case in which the setting of the ACT is turned off (No in step S2203), the ACT map generation unit 126 takes a count Count_mACT=0 in regard to the subblock (TU).

Next, the ACT map generation unit 126 determines whether the process is executed on all of the subblocks in the processing block (step S2206). In a case in which there is an unprocessed subblock (No in step S2206), the ACT map generation unit 126 executes the processes of steps S2202 to S2205 on the unprocessed subblock. In a case in which the process is executed on all of the subblocks (Yes in step S2206), the ACT map generation unit 126 stores a position ACT_map and a count Count_mACT of each subblock as the ACT map in the frame memory 113 (step S2207). Accordingly, the ACT map generation process on one processing block ends.

Next, a method of calculating the count Count_mACT of step S2204 in the ACT map generation process will be described.

The size of the transform block (TU) which is the sub-block in the ACT map generation process indicates the number of pixels in the transform block. Since the TU is set such that recursive quad-tree segmentation is executed on the processing block (CU), the number of pixels in the TU is different depending on the size of the CU and a segmentation form. That is, an influence of information regarding the pixels in the TU on the entire screen is different depending on the size of the TU. Therefore, when the count Count_mACT is calculated in step S2204, a value according to the size of each TU is calculated using a minimum size of the TU as a standard. That is, in a case in which a value (log 2TrafoSize) indicating how many powers of 2 the size of the currently processed TU has is a value (Log 2MinTrafoSize) indicating a minimum size of the TU decided separately at the time of encoding, the count Count_mACT is set to +1.

In a case in which the size log 2TrafoSize of the processing target TU is a size greater by one step than Log 2MinTrafoSize, the count Count_mACT is set to +4. Further, in a case in which the size log 2TrafoSize of the processing target TU is a size greater by two steps than Log 2MinTrafoSize, the count Count_mACT is set to +16.

When the CU is segmented into a plurality of TUs, the foregoing recursive quad-tree segmentation is executed. Therefore, one TU is segmented into 2×2 TUs. That is, a size of the TU greater by one step than the TU with the minimum size is 4 times the TU of the minimum size. Accordingly, in a case in which the size of the processing target TU is greater by one step than the minimum size, the influence of the processing target TU on the entire screen is considered to be 4 times the influence of the TU with the minimum size. Accordingly, in a case in which the size of the processing target TU is greater by one step than the minimum size, the count Count_mACT in the foregoing processing target TU is set to +4.

A size of the TU greater by two steps than the TU with the minimum size is 4 times the TU greater by one step than the TU with the minimum size. Accordingly, the size of the TU greater by two step than the TU with the minimum size is 16 times the TU with the minimum size. Accordingly, in a case in which the size of the processing target TU is greater by two steps than the minimum size, the count Count_mACT in regard to the foregoing processing target TU is set to +16.

The position of the processing target TU in the picture can be calculated from the position of a coding tree block (CTB) including the TU, the position of the CU in the CTB, and a depth of the TU. When (xCtb, yCtb) is the position of the CTB, positions (x, y) of 4 TUs at the time of quad-tree segmentation of the CTB into the CUs are expressed by Equation (4) below. In the Equation (4), the variable "CtbAddrInRs" denotes a coding tree block address in coding tree block raster scan of a picture.

$$(x, y) = \{(x0, y0), (x1, y0), (x0, y1), (x1, y1)\} \quad (4)$$
$$xCtb = (CtbAddrInRs \% PicWidthInCtbsY) \ll CtbLog2SizeY;$$
$$yCtb = (CtbAddrInRs / PicWidthInCtbsY) \ll CtbLog2SizeY;$$
$$x0 = xCtb;$$
$$y0 = yCtb;$$
$$x1 = x0 + (1 \ll (log2CtbSize - 1));$$
$$y1 = y0 + (1 \ll (log2CtbSize - 1));$$

The ACT map generation unit 126 executes, for example, the same calculation process as Equation (5) below as the ACT count process of step S2204 in FIG. 8. In the Equation (5), the conditional expression "beginning picture" denotes "xCtb==0 && yCtb==0".

$$\begin{aligned}
&\text{if (beginning picture) count\_mACT} = 0; \\
&\text{if } (ACT == 1) \{ \\
&\quad \text{for } (i = 0; i < log2TrafoSize - Log2MinTrafoSize; i++) \{ \\
&\quad\quad \text{for } (i = 0; i < log2TrafoSize - Log2MinTrafoSize; i++) \{ \\
&\quad\quad\quad ACT\_map[x + i][y + j] = 1; \\
&\quad\quad \} \\
&\quad \} \\
&\quad \text{count\_mACT} += 2^{\hat{}}(log2TrafoSize - Log2MinTrafoSize); \\
&\} \text{ else } \{ \\
&\quad \text{for } (i = 0; i < log2TrafoSize - Log2MinTrafoSize + 1; ++) \{ \\
&\quad\quad \text{for } (i = 0; i < log2TrafoSize - Log2MinTrafoSize + 1; ++) \{ \\
&\quad\quad\quad ACT\_map[i][j] = 0; \\
&\quad\quad \} \\
&\quad \} \\
&\quad \text{count\_mACT} += 0; \\
&\}
\end{aligned} \quad (5)$$

Figure 9:
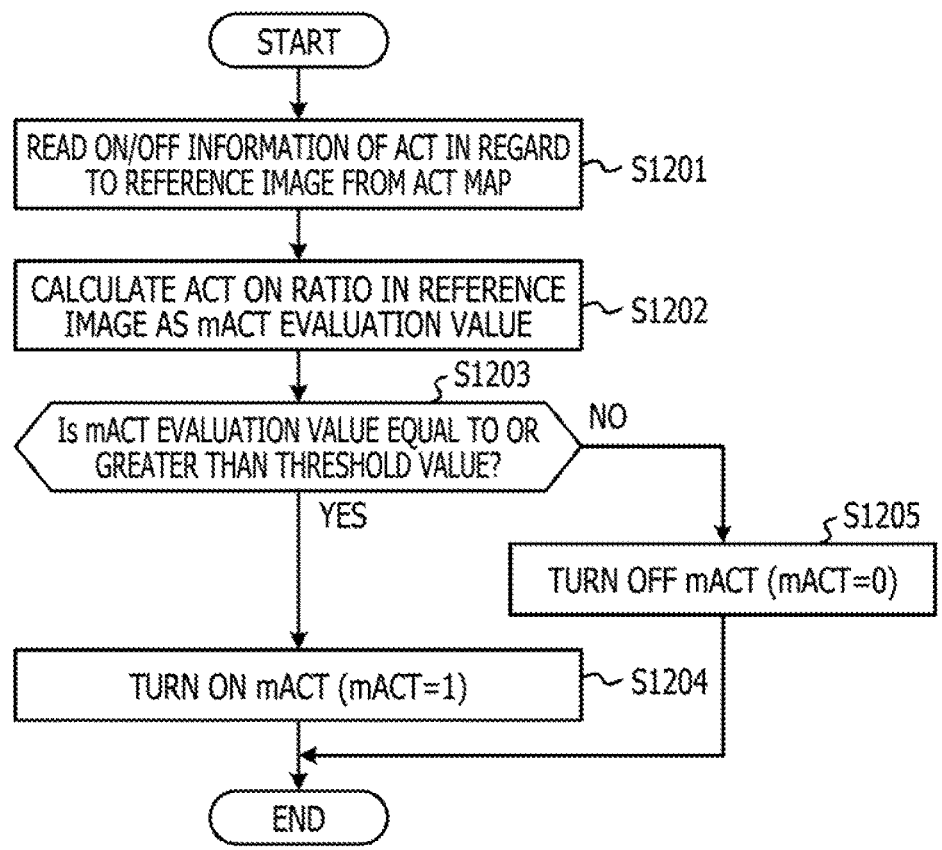
FIG. 9 is a flowchart illustrating a method of determining whether the mACT is turned on or off based on an ACT map.

FIG. 9 is a flowchart illustrating a method of determining whether the mACT is turned on or off based on an ACT map.

The mACT determination unit 125 in the moving picture encoding apparatus 1 according to the present embodiment determines whether the mACT is turned on or off based on the ACT map, as described above. As illustrated in FIG. 9, the mACT determination unit 125 first reads the ON/OFF information of the ACT in regard to the reference image used in the prediction from the ACT map (step S1201). In step S1201, for example, the mACT determination unit 125 reads the ON/OFF information of the ACT in regard to the reference block at the same position as the prediction block in the reference picture.

Next, the mACT determination unit 125 calculates an ACT ON ratio in the reference image as an mACT evaluation value (step S1202). The ACT ON ratio is a value indicating a ratio of a region encoded by turning on the ACT in the reference image (reference block).

Next, the mACT determination unit 125 determines whether the mACT evaluation value is equal to or greater than a threshold value (step S1203). In a case in which the mACT evaluation value is equal to or greater than the threshold value (Yes in step S1203), the mACT determination unit 125 sets the mACT to be turned on for the prediction (step S1204). In a case in which the mACT evaluation value is less than the threshold value (No in step S1203), the mACT determination unit 125 sets the mACT to be turned off for the prediction (step S1205).

The ACT ON ratio calculated as the mACT evaluation value is a value indicating a ratio of a region encoded by turning on the ACT in the reference image (reference block), as described above. Therefore, as the size of the TU encoded by turning on the ACT in the reference image is larger, the mACT evaluation value is larger. In the case in which the ACT is turned on, meaningful information can be concentrated on one component when the encoding is executed with the YCgCo format more than when the encoding is executed with the RGB format. In other words, as the mACT evaluation value indicates a larger value, the degree of deviation in information regarding the R, G, and B components in a video is lower. Conversely, as the mACT evaluation value indicates a lower value, the degree of deviation in the information regarding the R, G, and B components in the video is higher. Accordingly, in a case in which the mACT evaluation value is large (in the case in which the ACT ON ratio is high), it is considered that the meaningful information can be concentrated on one component for the prediction when the prediction is executed by transforming the RGB format into the YCgCo format more than when the prediction is executed while maintaining the RGB format. Accordingly, in the case in which the mACT evaluation value is equal to or greater than the threshold value (Yes in step S1203), the mACT determination unit 125 sets the mACT to be turned on and causes the intra prediction unit 101 and the inter prediction unit 102 to execute the prediction using the image data with the YCgCo format.

Hereinafter, examples of a method of calculating the ACT ON ratio in the case in which the ACT ON ratio is used as the mACT evaluation value will be described.

Figure 10:
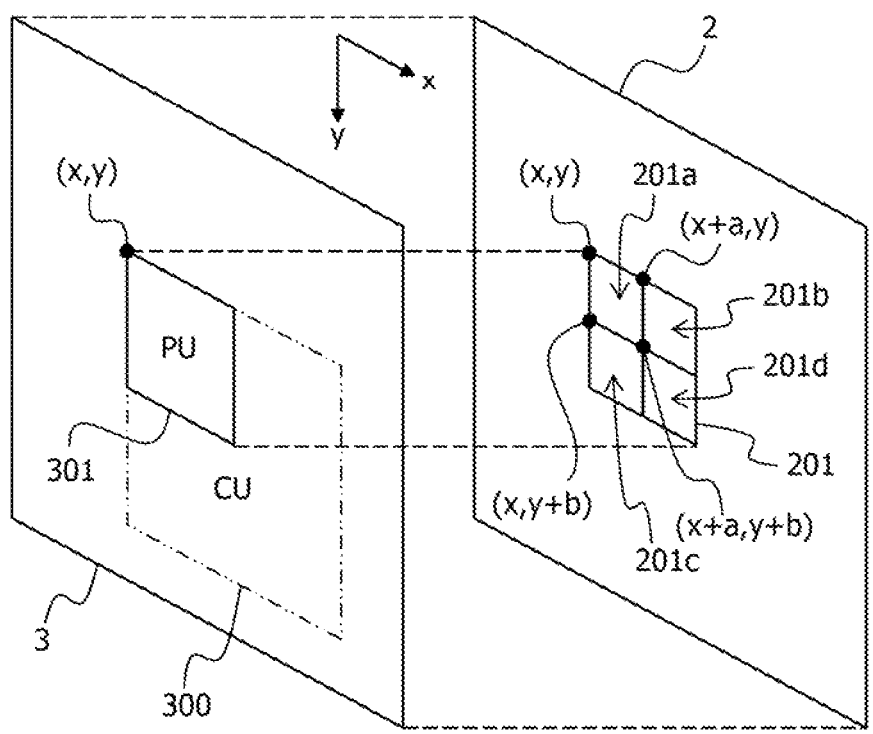
FIG. 10 is a diagram illustrating a first example of a method of calculating an ACT ON ratio.

FIG. 10 is a diagram illustrating a first example of the method of calculating the ACT ON ratio.

In the first example of the method of calculating the ACT ON ratio, ON/OFF information of the ACT in regard to a reference block 201 at the same position as a prediction block (PU) 301 of a processing target picture 3 in a reference picture 2 is used, as illustrated in FIG. 10. Referring to the information regarding the reference block at the same position as the prediction block in the inter prediction means simplicity of calculation at the time of searching for a similar position to the prediction block, and thus the referring is considerably valued.

In the inter prediction, a motion vector referring to an encoded picture is searched for. The motion vector is searched for based on the PU unit set in the CU separately from the TU. Therefore, the size of the PU is different from the size of the TU (where PU size TU size) and the motion vector is not suitable for a grid of the processing block (CU) in many cases. Accordingly, as illustrated in FIG. 10, the reference block 201 having the same size and located at the same position as the prediction block 301 of the processing block (CU) 300 include a plurality of TUs 201a, 201b, 201c, and 201d in many cases. In the cases, the mACT determination unit 125 adds all of the pieces of information regarding the ACT map overlapping the reference block 201 and determines whether the mACT is turned on or off.

When the mACT is determined to be turned on or off, as described above, the mACT evaluation value (the ACT ON ratio) is used. Therefore, the mACT determination unit 125 calculates an ACT ON ratio ACTeval in the reference block 201 of the reference picture 2 as an area ratio using, for example, Equation (6) below.

$$ACTeval = \frac{\sum_{a,b} (ACT\_map[a, b] \times Num[a, b])}{\sum_{a,b} Num[a, b]} \quad (6)$$

In Equation (6), a and b indicate positions in the horizontal and vertical directions of the subblock (TU) included in the reference block in the CU of which coordinates of the upper left corner are (x, y). Num[a, b] indicates an area of the subblock at the position (a, b) included in the reference block or the number of pixels included in the subblock.

That is, the mACT determination unit 125 compares the ACT ON ratio ACTeval (0≤ACTeval≤1) calculated using Equation (6) to a determination threshold value TH1. In a case of ACTeval≥TH1, the mACT is set to be turned on.

Figure 11:
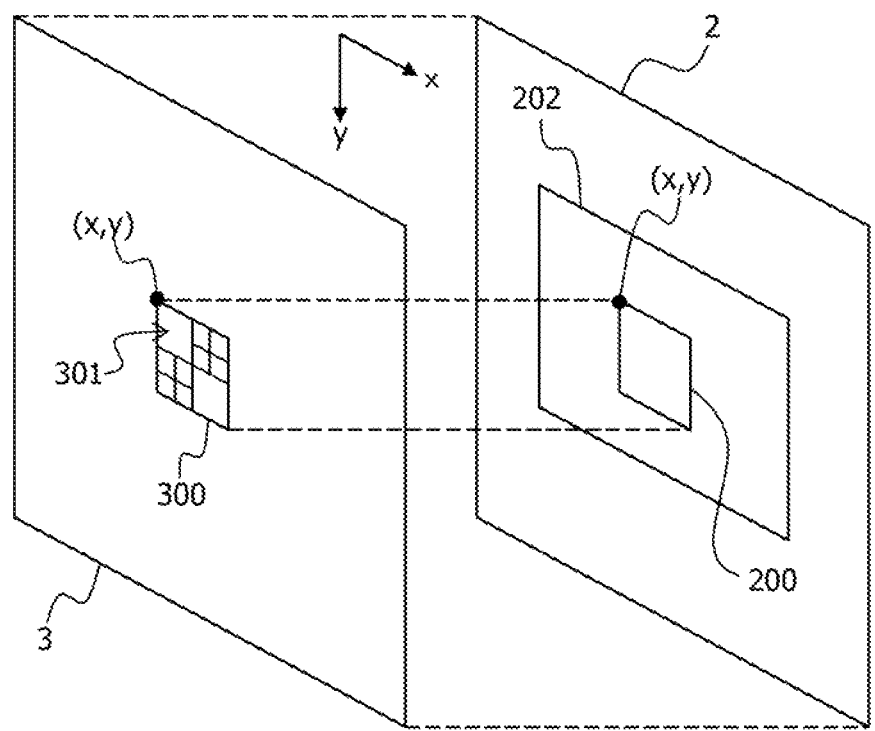
FIG. 11 is a diagram illustrating a second example of the method of calculating the ACT ON ratio.

FIG. 11 is a diagram illustrating a second example of the method of calculating the ACT ON ratio.

In the second example of the method of calculating the ACT ON ratio, as illustrated in FIG. 11, the ON/OFF information of the ACT within a search range 202 of a motion vector set in the reference picture 2 in the inter prediction is used. A reference destination of the motion vector in the inter prediction exists within the search range 202 of the motion vector set in the reference picture. The reference destination of the motion vector is a block that has high correlation with a current processing block 300. Therefore, in a case in which the search range 202 of the motion vector is all encoded in one state of the ON and OFF states of the ACT, prediction precision is considered to be good when the setting of the mACT of the current processing block 300 is configured to be the same as the setting of the ACT at the time of encoding of the search range.

In the first example, the reference block 200 of the reference picture 2 having the same size and located at the same position as the current processing block 300 of the current processing picture 3 is set as an evaluation target to calculate an mACT evaluation value. In the second example, however, a search range 202 of a motion vector with respect to the current processing block 300 when the inter prediction unit 102 executes motion searching is set as an evaluation target. Therefore, in the second example, an area to be evaluated is larger than in the first example. That is, while the subblock (a, b) in the CU is evaluated in the first example, the CU is also counted as a search range in the second example.

Here, in a case in which horizontal −H to +H−1 and vertical −V to +V−1 are set centering on an ACT map (for example, (0, 0)) of a search range of a current processing block, a current block size is set to 0 h×0 v, [−H, −V] is set as upper left, and a result of the ACT map in an area of (2 H+0 h)×(2V+0 v) is used for determination. That is, basically, the reference block 200 at the same position as the current processing block 300 in the first example is changed to the search range 202 of the current processing block 300 in the second example. Therefore, in the second example, the mACT determination unit 125 calculates the ACT ON ratio ACTeval in a reference destination block as an area ratio using, for example, Equation (7) below.

$$ACTeval = \frac{\sum_{x,y} \sum_{a,b} (ACT\_map[x + a, y + b] \times Num[x + a, y + b])}{\sum_{x,y} \sum_{a,b} Num[x + a, y + b]} \quad (7)$$

In Equation (7), x and y are positions in the horizontal and vertical directions in the search range 202.

As in the first embodiment, referring to the information regarding the reference block at the same position as the prediction block in the inter prediction means simplicity of calculation at the time of searching for a similar position to the prediction block, and thus the referring is considerably valued. Therefore, in the second example, for example, the ACT ON ratio may be calculated by weighting an ACT determination result in the reference block 200 at the same position as the current processing block 300 of the current processing picture 3 included in the search range 202 of the motion vector of the reference picture 2. In the second example, instead of the reference block 200 at the same position as the current processing block 300 of the current processing picture 3 included in the search range 202, for example, a reference block at a position deviated from the same position by the magnitude of a separately obtained global vector may be weighted.

Figure 12:
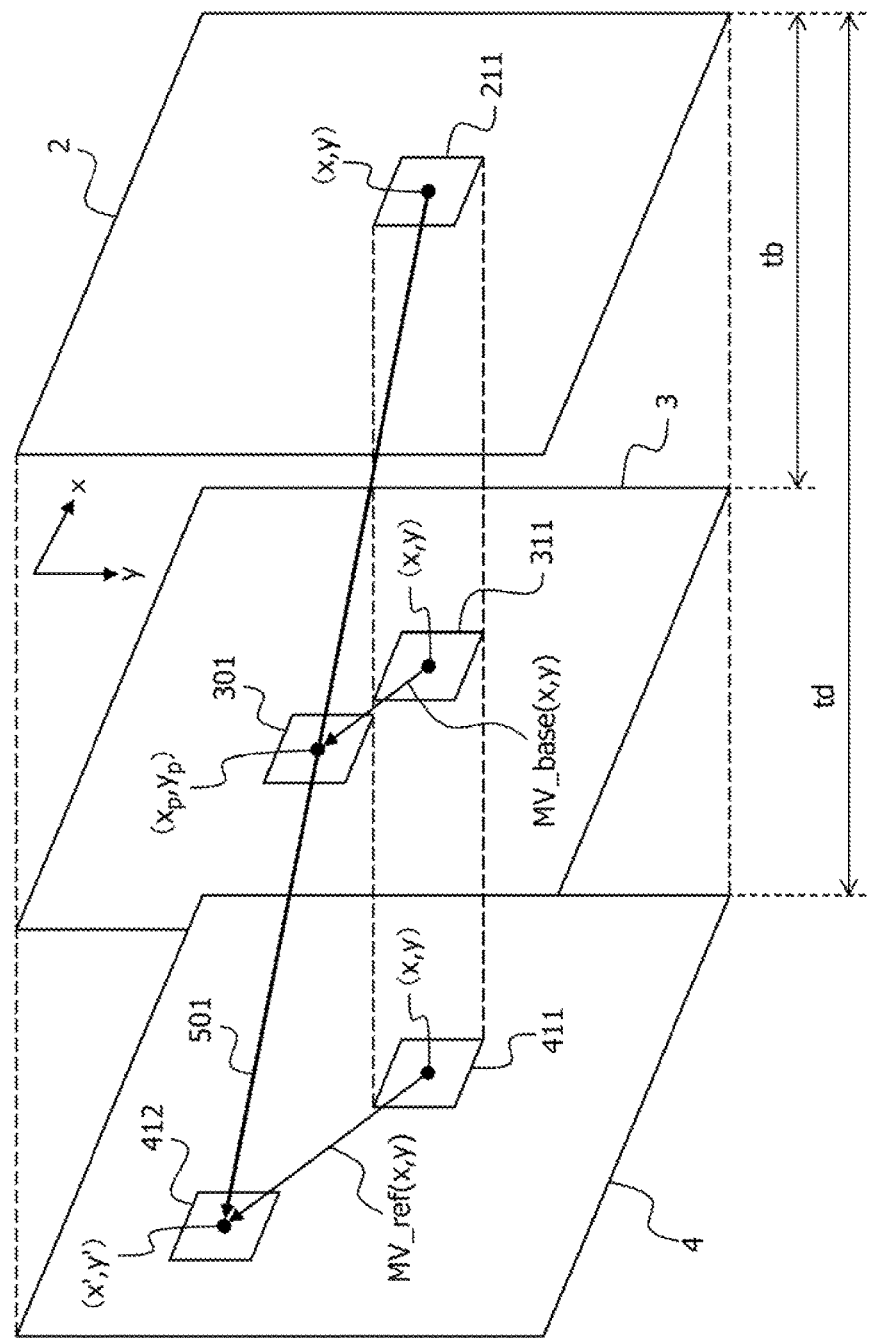
FIG. 12 is a diagram illustrating a third example of the method of calculating the ACT ON ratio.

FIG. 12 is a diagram illustrating a third example of the method of calculating the ACT ON ratio.

In the third example of the method of calculating the ACT ON ratio, a motion vector at the time of encoding of a reference block at the same position as a current prediction block is used to calculate a motion vector indicating a current picture through ratio calculation from the reference block at the same position. Then, based on the motion vector indicating the calculated current picture, a reference block to be used to calculate an ACT ON ratio is decided.

When the inter prediction unit 102 executes inter frame prediction, for example, as illustrated in FIG. 12, prediction is executed in some cases using a second reference picture 4 temporally later than a first reference picture 2 and temporally earlier than a current processing picture 3. Here, a reference block 211 in the first reference picture 2 and a reference block 412 in the second reference picture 4 are assumed to have high correlation (similarity). In this case, a motion vector 501 from the reference block 211 of the first reference picture 2 to the reference block 412 of the second reference picture 4 can be expressed as a motion vector MV_ref(x, y) owned by a block 411 at the same position as the reference block 211 of the first reference picture 2 in the second reference picture 4. When the motion vector MV_ref (x, y) is given, a motion vector MV_base(x, y) owned by a block 311 of the current processing picture 3 at the same position as the reference block 211 of the first reference picture 2 can be calculated by Equation (8) below.

$$MV\_base(x,y)=MV\_ref(x,y)\times(tb/td) \quad (8)$$

In Equation (8), tb and td are a temporal distance from the first reference picture 2 to the current processing picture 3 and a temporal distance from the first reference picture 2 to the second reference picture 4.

The motion vector MV_base(x, y) calculated by Equation (8) is opposite in direction in a case in which the current processing picture 3 is indicated from the reference picture and in a case in which the reference picture is indicated from the current processing picture 3. The motion vector MV_base(x, y) is a motion vector owned by the processing block 311 of the current processing picture 3 at the same position as the reference block 211 of the first reference picture 2. On the other hand, a block which has high correlation (similarity) with the reference block 211 of the first reference picture 2 in another picture is a reference block present in a direction expressed by the motion vector 501 illustrated in FIG. 12. That is, a block which has high correlation (similarity) with the reference block 211 of the first reference picture 2 in the current processing picture 3 is the processing block 301 centering on a position (xp, yp). Therefore, in a case in which the mACT is determined to be turned on or off in the third example, the mACT determination unit 125 may refer to the ACT map from a position deviated by the magnitude of −MV_base(x, y) from the reference block 211 in the first reference picture 2. That is, the method of calculating the ACT ON ratio in the third example is basically the same as that of the first example, but a position at which the ACT map is referred to is a position deviated by −MV_base(x, y).

In this way, in the third example, the ACT ON ratio is calculated referring to the ACT map in consideration of a motion between the current processing picture and the reference picture. Therefore, it is possible to determine whether the mACT is turned on or off more appropriately than in the first example.

In the third example, instead of calculating the deviation in the motion based on the motion vector owned by the blocks at the same position between the pictures, a global vector obtained from motion vectors of the entire reference picture may be used. In the third embodiment, for example, either a motion vector or a global vector owned by blocks at the same position between pictures may be selected according to the characteristics of processing target moving picture data (picture), and a reference block to be used to calculate an ACT ON ratio may be obtained.

Figure 13:
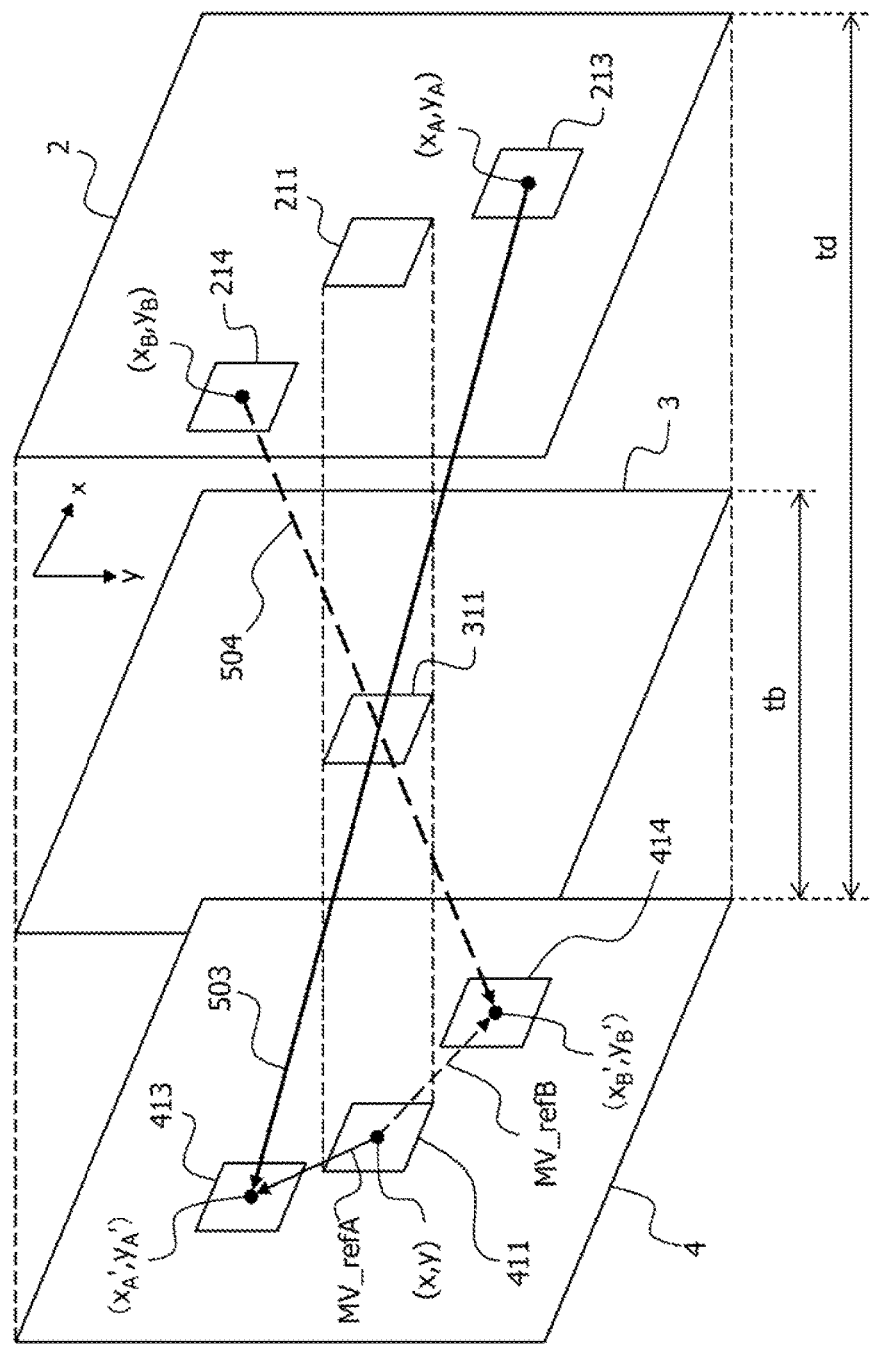
FIG. 13 is a diagram illustrating a fourth example of the method of calculating the ACT ON ratio.

FIG. 13 is a diagram illustrating a fourth example of the method of calculating the ACT ON ratio.

In the fourth example of the method of calculating the ACT ON ratio, all of the blocks of a reference picture are set as targets and a reference block to be used to calculate an ACT ON ratio is selected from reference blocks in which a motion vector scaled by time division refers to a current processing block.

For example, as illustrated in FIG. 13, a first reference block 213 and a second reference block 214 exist as reference blocks referring to a processing block 311 of a current processing picture 3 in a first reference picture 2 in some cases. In the cases, a reference block to be used to calculate the ACT ON ratio is selected based on a motion vector MV_base in the current processing picture 3 calculated using the reference blocks 213 and 214.

First, in a case in which the first reference block 213 in the first reference picture 2 is selected, a motion vector owned by a reference block 413 in a second reference picture 4 is assumed to be MV_refA. At this time, a motion vector owned by the processing block 311 of the current processing picture 3 can be calculated in the same point of view as the third example. That is, the motion vector can be calculated using a temporal distance td from the first reference picture 2 to the second reference picture 4, a temporal distance tb from the current processing picture 3 to the second reference picture 4, and motion vectors in the reference pictures.

Further, in a case in which the second reference block 214 in the first reference picture 2 is selected, a motion vector owned by a reference block 414 in a second reference picture 4 is assumed to be MV_refB. At this time, a motion vector owned by the processing block 311 of the current processing picture 3 can be calculated in the same point of view as the third example.

In this way, in the fourth example, in a case in which there are the plurality of reference blocks referring to the current processing block, the reference block to be used to calculate the ACT ON ratio is selected based on the motion vector MV_base in the current processing picture calculated using each reference block. Accordingly, in the fourth example, the block having higher correlation with the current processing block can be selected as the reference block to be used to calculate the ACT ON ratio. In particular, when the reference block having a motion vector closest to a global vector is selected using the global vector, the better reference block can be considered to be selected. After the reference block is selected, the ACT ON ratio can be calculated as in the third example.

In the fourth example, the block referring to the current processing block is not present in the reference picture. Therefore, in the fourth example, any combination of the first to third examples may be used.

As described above, in the encoding for the moving picture according to the present embodiment, the mACT is determined to be turned on or off for each processing block or prediction block in a case in which the picture with the RGB format is input and one component is mainly used among three components of the color space for the prediction. In the case in which the mACT is turned on, the intra prediction unit 101 and the inter prediction unit 102 executes the prediction using the image data of which the color space is transformed from the RGB format to the YCgCo format. In the case in which the mACT is turned off, the intra prediction unit 101 and the inter prediction unit 102 executes the prediction using the image data of which the color space is the RGB format.

Therefore, in the encoding for the moving picture according to the present embodiment, the format of the higher precision can be selected between the RGB format and the YCgCo format according to the characteristics of the color space information in the input picture to execute the prediction. For example, in a case in which the meaningful information is averagely included in each of the components R, G, and B, the meaningful information of each of the components R, G, and B can be concentrated on the luminance component Y by transforming the RGB format into the YCgCo format. In a case in which the meaningful information is concentrated on any one of the three R, G, and B components, it is possible to suppress the meaningful information of one component from being reduced by executing the prediction while maintaining the RGB format.

In the present embodiment, as described above, the mACT is determined to be turned on or off for each processing block or prediction block using the ACT map. Therefore, in a case in which a picture includes a plurality of regions in which balance of the RGB components in the picture is different, the mACT can be determined to be turned on or off according to the position of the processing block or the prediction block. For a prediction block in which there are many TUs encoded with the YCgCo format in the reference block, the prediction can be executed with the YCgCo format by turning on the mACT in the YCgCo format. That is, by determining whether the mACT is turned on or off using the ACT map, it is possible to execute the prediction suitable for the color space format when the reference picture is encoded. Thus, it is possible to execute the prediction with higher precision in the encoding for the moving picture according to the present embodiment.

Thus, according to the present embodiment, it is possible to execute the prediction with higher precision while suppressing an increase in a calculation amount. Accordingly, according to the present embodiment, it is possible to improve a capability to encode the moving picture.

The flowcharts of FIGS. 7A, 7B, 8, and 9 are merely examples. Content of some of the processes may be modified as inevitable or other processes may be added.

The ACT ON ratio used as the mACT evaluation value is not limited to the foregoing first to fourth examples, but may be calculated based on the ON/OFF setting of the ACT in a specific reference block in accordance with another method. The ACT ON ratio is merely an example of the mACT evaluation value. The mACT evaluation value can be calculated using the ACT map may be another value by which it is possible to determine either the RGB format or the YCgCo format to execute the prediction with high precision.

Figure 14:
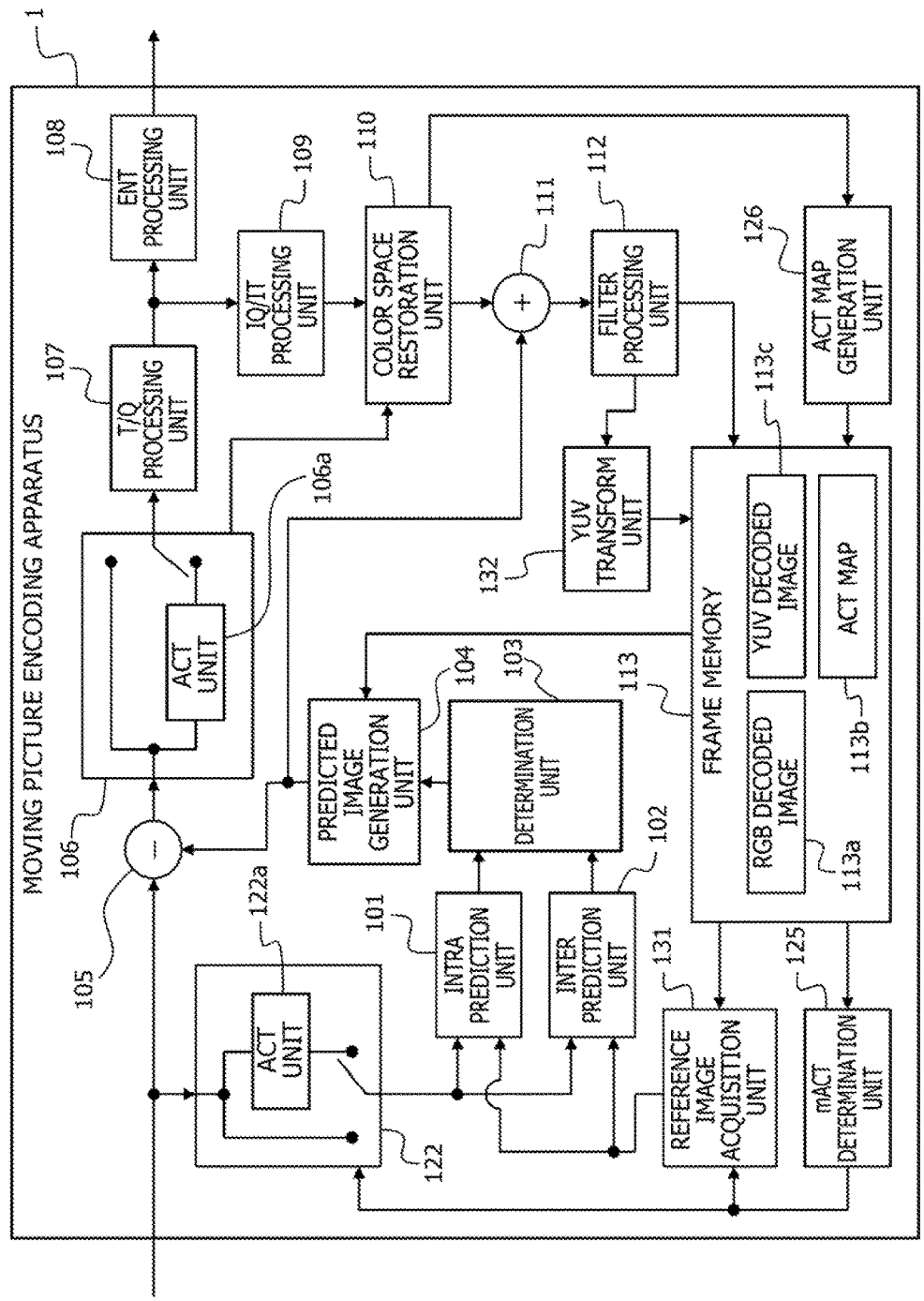
FIG. 14 is a diagram illustrating a functional configuration of a moving picture encoding apparatus according to a third embodiment.

FIG. 14 is a diagram illustrating a functional configuration of a moving picture encoding apparatus according to a third embodiment.

As illustrated in FIG. 14, a moving picture encoding apparatus 1 according to the present embodiment includes an intra prediction unit 101, an inter prediction unit 102, a determination unit 103, a predicted image generation unit 104, and a prediction error signal generation unit 105. The moving picture encoding apparatus 1 includes a first color space selection unit 106, a T/Q processing unit 107, and an ENT processing unit 108. The moving picture encoding apparatus 1 further includes an IQ/IT processing unit 109, a color space restoration unit 110, a decoded image generation unit 111, a filter processing unit 112, and a frame memory 113. The moving picture encoding apparatus 1 according to the present embodiment further includes an mACT determination unit 125, a second color space selection unit 122, a reference image acquisition unit 131, a YUV transform unit 132, and an ACT map generation unit 126.

The intra prediction unit 101, the inter prediction unit 102, the determination unit 103, the predicted image generation unit 104, and the prediction error signal generation unit 105 in the moving picture encoding apparatus 1 according to the present embodiment have the foregoing respective functions. The first color space selection unit 106 in the moving picture encoding apparatus 1 has the same function as the foregoing first color space selection unit 106 (see FIG. 1). The T/Q processing unit 107, the ENT processing unit 108, the IQ/IT processing unit 109, the color space restoration unit 110, the decoded image generation unit 111, the filter processing unit 112, and the frame memory 113 in the moving picture encoding apparatus 1 have the foregoing respective functions. The frame memory 113 in the moving picture encoding apparatus 1 according to the present embodiment stores an RGB decoded image 113a, a YUV decoded image 113c, and an ACT map 113b. The RGB decoded image 113a and the YUV decoded image 113c are a decoded image with the RGB format and a decoded image with the YUV format, respectively.

The mACT determination unit 125 of the moving picture encoding apparatus 1 according to the present embodiment determines which image data with either the RGB format or the YUV format is used for prediction, in other words, determines whether the ACT (mACT) for prediction is turned on or off. The mACT determination unit 125 according to the present embodiment determines whether the mACT is turned on or off based on an ACT map 113d stored in the frame memory 113, as described in the second embodiment. The mACT determination unit 125 outputs an ON/OFF determination result of the mACT to the second color space selection unit 122 and the reference image acquisition unit 131.

In a case in which a picture (moving picture data) input to the moving picture encoding apparatus 1 has the RGB format and one component is mainly used among three components for the prediction, the mACT determination unit 125 determines which image data with either the RGB format or the YUV (YCgCo) format is used for prediction. That is, in a case in which the moving picture data input to the moving picture encoding apparatus 1 has the YUV format, the mACT determination unit 125 determines that the prediction is executed using the image data with the YUV format (determines that the mACT is turned on). The mACT determination unit 125 determines whether the input moving picture data has the RGB format or the YUV format by, for example, a control signal from an overall control unit (not illustrated in FIG. 14) that controls an overall operation of the moving picture encoding apparatus 1.

The second color space selection unit 122 selects a color space of original image data input to the intra prediction unit 101 and the inter prediction unit 102 based on a determination result of the mACT determination unit 125. The second color space selection unit 122 includes an ACT unit 122a and a switch (not illustrated). The ACT unit 122a transforms the color space of the original image data from the RGB format to the YCgCo format. Whether the original image data with the RGB format input to the second color space selection unit 122 is output while maintaining the RGB format or the original image data with the RGB format is transformed into the YCgCo format by the ACT unit 122a is switched by the switch.

The reference image acquisition unit 131 selects the color space format of the reference image data to be input to the intra prediction unit 101 and the inter prediction unit 102 based on the determination result of the mACT determination unit 125 and acquires the reference image data with the selected color space format. In the case in which the mACT is turned off, the reference image acquisition unit 131 acquires the reference image data from the RGB decoded image 113a of the frame memory 113. Conversely, in the case in which the mACT is turned on, the reference image acquisition unit 131 acquires the reference image data from the YUV decoded image 113c of the frame memory 113.

The YUV transform unit 132 transforms the color space format of the decoded image subjected to the filter process by the filter processing unit 112 from the RGB format to the YCgCo format. The YUV transform unit 132 stores the decoded image (that is, the YUV decoded image 113c) transformed into the YCgCo format in the frame memory 113.

The ACT map generation unit 126 generates an ACT map including screen position information and the number of counts by counting whether encoding (orthogonal transform and quantization) is executed using a one process between ACT ON and ACT OFF for each picture. The ACT map generation unit 126 of the moving picture encoding apparatus 1 according to the present embodiment generates an ACT map, for example, by executing the ACT map generation process (see FIG. 8) described in the second embodiment. The ACT map generation unit 126 stores the generated ACT map 113b in the frame memory 113.

Figure 15A:
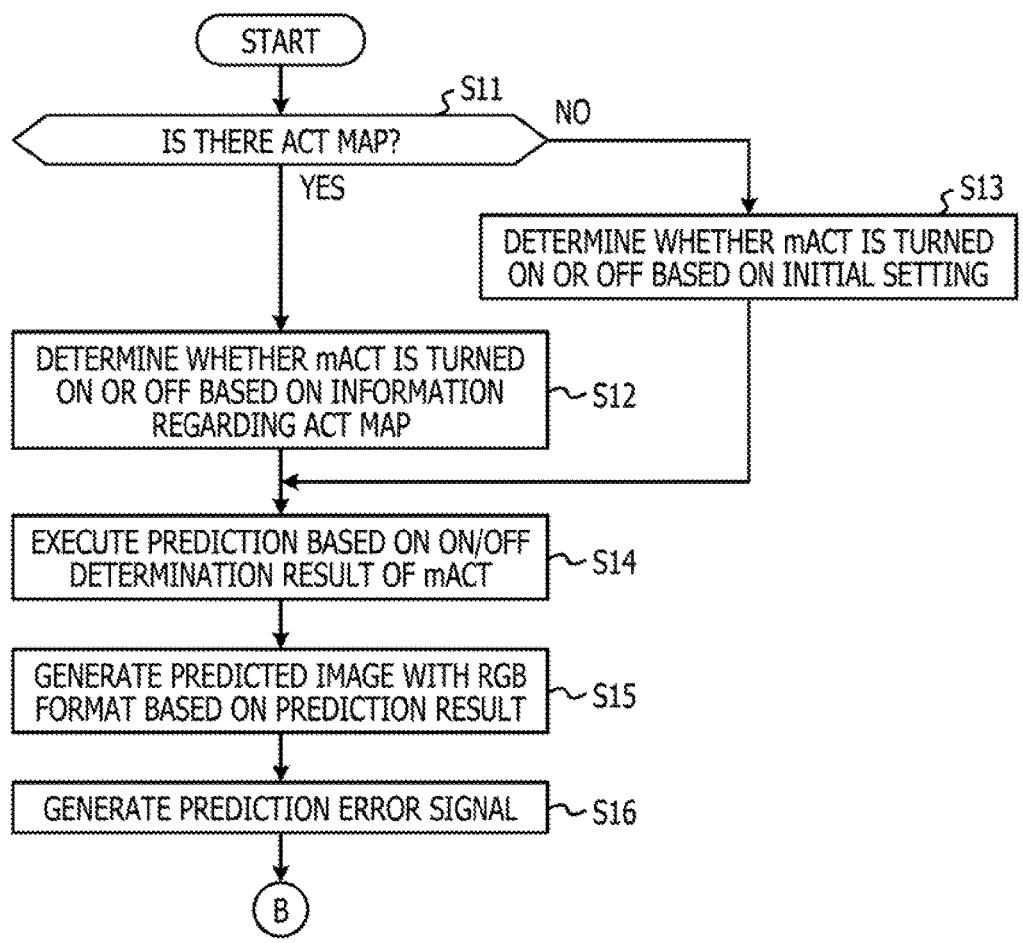
FIG. 15A is a flowchart (part 1) illustrating an encoding process according to the third embodiment.
Figure 15B:
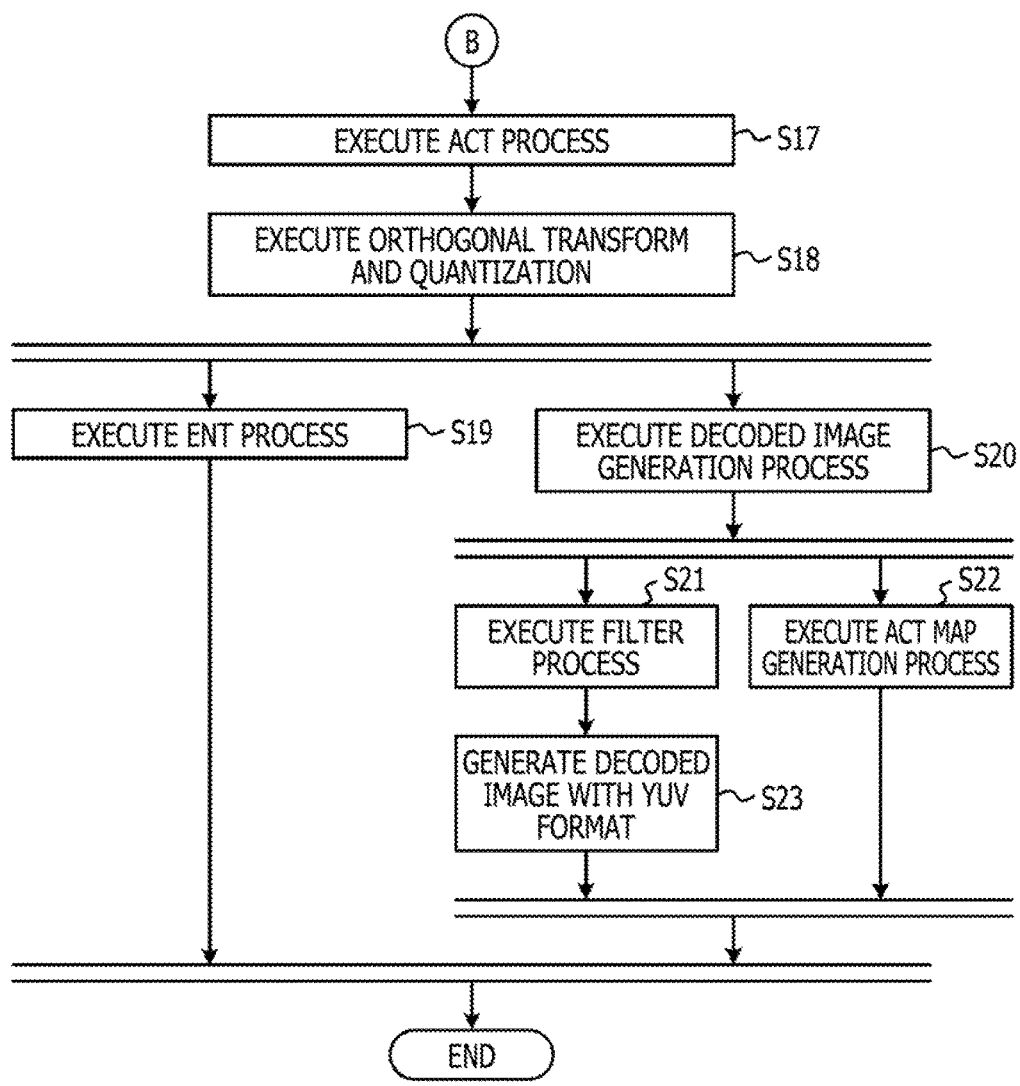
FIG. 15B is a flowchart (part 2) illustrating the encoding process according to the third embodiment.

FIG. 15A is a flowchart (part 1) illustrating an encoding process according to the third embodiment. FIG. 15B is a flowchart (part 2) illustrating the encoding process according to the third embodiment. FIGS. 15A and 15B illustrate flowcharts of an encoding process on one processing block in a case in which the picture (the original image data) with the RGB format is input and the prediction is executed mainly using one component among three components of the color space. The prediction executed using mainly one component among three components of the color space is prediction of a case in which a flag "separate_colour_plane_flag" present in the SPS header is "separate_colour_plane_flag=0", as described in the first embodiment. For example, the overall control unit (not illustrated in FIG. 14) controlling an overall operation of the moving picture encoding apparatus 1 determines whether the input picture has the RGB format. The overall control unit determines whether the prediction is executed mainly using one component among three components, for example, by a value of the flag "separate_colour_plane_flag".

In a case in which the prediction is executed on the input picture with the RGB format mainly using one component among three components of the color space, the moving picture encoding apparatus 1 first determines whether there is the ACT map usable for the ON/FF determination of the mACT, as illustrated in FIG. 15A (step S11). The mACT determination unit 125 executes step S11. In a case in which there is the ACT map usable for the determination (Yes in step S11), the mACT determination unit 125 determines whether the mACT is turned on or off based on the ACT map (step S12). Conversely, in a case in which there is no ACT map usable for the determination (No in step S11), the mACT determination unit 125 determines whether the mACT is turned on or off based on initial setting (step S13). The mACT determination unit 125 outputs the determination result of step S12 or S13 to the second color space selection unit 122 and the reference image acquisition unit 131. In step S12, the mACT is determined to be turned on or off based on the ACT ON ratio (the mACT evaluation value) calculated in accordance with, for example, the same method described in the second embodiment. The initial setting in the determination of step S13 is, for example, setting in which the mACT is normally turned on or setting in which the determination is executed using variances or the like of the RGB components, as in the first embodiment.

Thereafter, in the moving picture encoding apparatus 1, a prediction process is executed based on the ON/OFF determination result of the mACT (step S14). The prediction process of step S14 is executed in cooperation with the second color space selection unit 122, the reference image acquisition unit 131, the intra prediction unit 101, the inter prediction unit 102, and the determination unit 103.

In a case in which the mACT is turned on, the second color space selection unit 122 outputs the original image data transformed into the YCgCo format by the ACT unit 122a to the intra prediction unit 101 and the inter prediction unit 102. In the case in which the mACT is turned on, the reference image acquisition unit 131 outputs the reference image data read from the decoded image (the YUV decoded image 113c) with the YCgCo format in the frame memory 113 to the intra prediction unit 101 and the inter prediction unit 102.

Conversely, in a case in which the mACT is turned off, the second color space selection unit 122 outputs the input original image data with the RGB format to the intra prediction unit 101 and the inter prediction unit 102, while maintaining the RGB format. In the case in which the mACT is turned on, the reference image acquisition unit 131 outputs the reference image data read from the decoded image (the RGB decoded image 113a) with the RGB format in the frame memory 113 to the intra prediction unit 101 and the inter prediction unit 102.

Each of the intra prediction unit 101 and the inter prediction unit 102 executes the prediction using the original image data input from the second color space selection unit 122 and the reference image data input from the reference image acquisition unit 131. Each of the intra prediction unit 101 and the inter prediction unit 102 executes the prediction based on the prediction block (PU) unit set in the processing block (CU). When the intra prediction unit 101 and the inter prediction unit 102 end the prediction on each prediction block included in one processing block, the intra prediction unit 101 and the inter prediction unit 102 output the prediction result to the determination unit 103. The determination unit 103 determines a prediction result (predicted image) in which an encoding cost is the minimum based on the prediction results of the intra prediction unit 101 and the inter prediction unit 102. The determination unit 103 outputs the determination result, that is, the prediction result in which the encoding cost is the minimum, to the predicted image generation unit 104. Accordingly, the prediction process of step S14 on one processing block (CU) ends.

When the prediction process of step S14 ends, the predicted image generation unit 104 subsequently generates a predicted image with the RGB format based on the prediction result (step S15). The predicted image generation unit 104 outputs the generated predicted image to the prediction error signal generation unit 105. The predicted image is also used when a local decoded image is generated. Therefore, the predicted image generated by the predicted image generation unit 104 is output to the prediction error signal generation unit 105 and is also stored in, for example, a buffer (not illustrated) included in the decoded image generation unit 111 or the like.

After the predicted image is generated, the prediction error signal generation unit 105 in the moving picture encoding apparatus 1 generates a prediction error signal (step S16). The prediction error signal generation unit 105 generates the prediction error signal with the RGB format using the original image data and the predicted image with the RGB format. The prediction error signal generation unit 105 outputs the generated prediction error signal with the RGB format to the first color space selection unit 106.

After the prediction error signal is generated, as illustrated in FIG. 15B, the first color space selection unit 106 in the moving picture encoding apparatus 1 executes the ACT process (step S17). The first color space selection unit 106 determines whether the prediction error signal is output to the T/Q processing unit 107 while maintaining the RGB format or the prediction error signal is transformed into the YCgCo format and is output to the T/Q processing unit 107 for each transform block (TU) set in the processing block (CU). In a case in which the prediction error signal with the RGB format is output to the T/Q processing unit 107, the first color space selection unit 106 outputs the prediction error signal from the prediction error signal generation unit 105 to the T/Q processing unit 107 without transform. Conversely, in a case in which the prediction error image transformed into the YCgCo format is output to the T/Q processing unit 107, the first color space selection unit 106 transforms the prediction error signal from the RGB format to the YCgCo format through the inverse transform of Equation (1) in the ACT unit 106a. When the ACT process on one processing block (CU) ends, the first color space selection unit 106 stores ON/OFF information of the ACT regarding each transform block to a buffer (not illustrated) included in the color space restoration unit 110 or the like.

When the prediction error signal is input to the T/Q processing unit 107 through the ACT process executed by the first color space selection unit 106, the T/Q processing unit 107 executes the orthogonal transform and the quantization based on the transform block (TU) unit (step S18). The T/Q processing unit 107 determines whether the transform block has either the RGB format or the YCgCo format and executes the orthogonal transform and the quantization corresponding to each format. A transform coefficient quantized by the T/Q processing unit 107 is output to the ENT processing unit 108. When the transform coefficient quantized by the T/Q processing unit 107 is input, the ENT processing unit 108 executes an ENT process of executing arithmetic encoding or entropy encoding on the input transform coefficient to generate a bit stream (step S19).

The transform coefficient quantized by the T/Q processing unit 107 is also used to generate a reference image (local decoded image) at the time of encoding of a subsequent processing block or picture. That is, after the orthogonal transform and the quantization of step S18 are executed, the moving picture encoding apparatus 1 executes the ENT process and also executes a decoded image generation process (step S20) and a filter process (step S21). The decoded image generation process of step S20 is executed by the IQ/IT processing unit 109, the color space restoration unit 110, and the decoded image generation unit 111. The filter process of step S21 is executed by the filter processing unit 112. In the decoded image generation process of step S20, the IQ/IT processing unit 109 first executes the inverse orthogonal transform and the inverse quantization on the transform coefficient quantized by the T/Q processing unit 107 to restore the prediction error image before the execution of the orthogonal transform. Next, the color space restoration unit 110 executes inverse transform on the transform block from the YCgCo format to the RGB format based on ON/OFF information of the ACT in regard to each transform block (TU) in the prediction error image (processing block) to restore the prediction error signal with the RGB format. Thereafter, the decoded image generation unit 111 generates a decoded image with the RGB format in regard to the original image data using the prediction error signal restored in the RGB format and the predicted image generated by the predicted image generation unit 104. In the filter process of step S21, for example, the filter processing unit 112 executes a filter process on the decoded image generated by the decoded image generation unit 111. In a case in which a moving picture is encoded in conformity with the H.265/HEVC standard, for example, the filter processing unit 112 continuously executes the SAO process after the deblocking filter process. When the predetermined filter process on the decoded image ends, the filter processing unit 112 stores the decoded image (the RGB decoded image 113a) with the RGB format subjected to the filter process in the frame memory 113.

Further, the filter processing unit 112 in the moving picture encoding apparatus 1 according to the present embodiment inputs the decoded image with the RGB format subjected to the filter process to the YUV transform unit 132. The YUV transform unit 132 generates the decoded image with the YUV format from the input decoded image with the RGB format through the inverse transform of Equation (1) (step S23). The YUV transform unit 132 stores the generated decoded image (the YUV decoded image 113c) with the YUV format in the frame memory 113.

In the moving picture encoding apparatus 1 according to the present embodiment generates the decoded image in step S20, and subsequently executes the ACT map generation process (step S22) along with the filter process (step S21) and the process of generating the decoded image with the YUV format (step S23). The ACT map generation process of step S22 is executed by the ACT map generation unit 126. The ACT map generation unit 126 generates the ACT map including screen position information and the number of counts in regard to the TU subjected to the orthogonal transform and quantization by turning on the ACT, based on the ON/OFF information of the ACT for each transform block (TU) used by the color space restoration unit 110. The ACT map generation unit 126 generates the ACT map in accordance with, for example, the method described in the second embodiment.

The ACT map generation unit 126 stores the generated ACT map 113b in the frame memory 113. The ACT map 113b stored in the frame memory 113 is referred to by the mACT determination unit 125 to determine whether the mACT is turned on or off at the time of prediction of the subsequent processing block.

As described above, the encoding process on one processing block (CU) ends in the moving picture encoding apparatus 1.

In the moving picture encoding apparatus 1, the processes of steps S11 to S23 are sequentially executed on each of the plurality of processing blocks set in one picture. At this time, the moving picture encoding apparatus 1 executes the processes of steps S11 to S23 on each processing block in a pipeline way.

As described above, in the encoding for the moving picture according to the present embodiment, the mACT is determined to be turned on or off for each processing block or prediction block in a case in which the picture with the RGB format is input and one component is mainly used among three components of the color space for the prediction. In the case in which the mACT is turned on, the intra prediction unit 101 and the inter prediction unit 102 execute the prediction using the image data of which the color space is transformed from the RGB format to the YCgCo format. In the case in which the mACT is turned off, the intra prediction unit 101 and the inter prediction unit 102 execute the prediction using the image data of which the color space is the RGB format.

Therefore, in the encoding for the moving picture according to the present embodiment, the format of the higher precision can be selected between the RGB format and the YCgCo format according to the characteristics of the color space information in the input picture to execute the prediction. For example, in a case in which the meaningful information is averagely included in each of the components R, G, and B, the meaningful information of each of the components R, G, and B can be concentrated on the luminance component Y by transforming the RGB format into the YCgCo format. In a case in which the meaningful information is concentrated on any one of the three R, G, and B components, it is possible to suppress the meaningful information of one component from being reduced by executing the prediction while maintaining the RGB format.

In the present embodiment, as described above, the mACT is determined to be turned on or off for each processing block or prediction block using the ACT map. Therefore, in a case in which a picture includes a plurality of regions in which balance of the RGB components in the picture is different, the mACT can be determined to be turned on or off according to the position or the size of the processing block (or the prediction block). For a prediction block in which there are many TUs encoded with the YCgCo format in the reference block, the prediction can be executed with the YCgCo format by turning on the mACT in the YCgCo format. That is, by determining whether the mACT is turned on or off using the ACT map, it is possible to execute the prediction suitable for the color space format when the reference picture is encoded. Thus, it is possible to execute the prediction with higher precision in the encoding for the moving picture according to the present embodiment.

Thus, according to the present embodiment, it is possible to execute the prediction with higher precision while suppressing an increase in a calculation amount. Accordingly, according to the present embodiment, it is possible to improve a capability to encode the moving picture.

The flowcharts of FIGS. 15A and 15B are merely examples. Content of some of the processes may be modified as inevitable or other processes may be added. For example, the decoded image with the YUV format may be generated in the decoded image generation process (step S20).

The moving picture encoding apparatus 1 according to the first to the third embodiments can each be realized by a computer and a program that causes the computer to execute the encoding process including the foregoing mACT determination process. Hereinafter, the moving picture encoding apparatus 1 realized by the computer and the program will be described with reference to FIG. 16.

Figure 16:
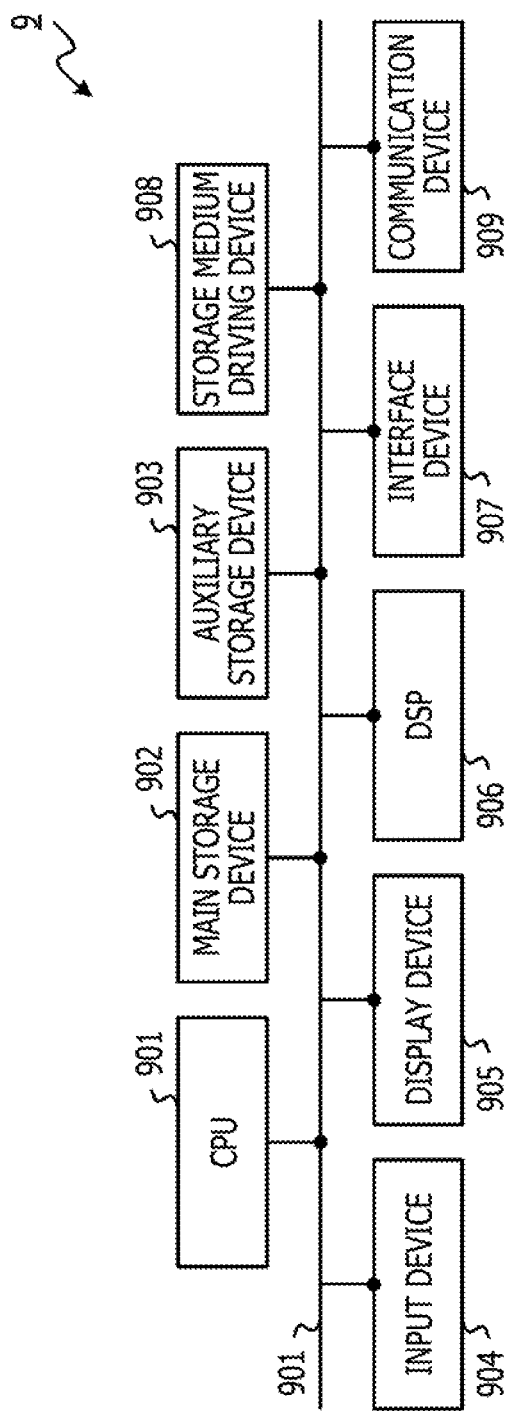
FIG. 16 is a diagram illustrating a hardware configuration of a computer.

FIG. 16 is a diagram illustrating a hardware configuration of a computer. As illustrated in FIG. 16, a computer 9 operated as the moving picture encoding apparatus 1 includes a central processing unit (CPU) 901, a main storage device 902, an auxiliary storage device 903, an input device 904, and a display device 905. The computer 9 further includes a digital signal processor (DSP) 906, an interface device 907, a storage medium driving device 908, and a communication device 909. These elements 901 to 909 in the computer 9 are connected to each other by a bus 910 so that data can be transmitted and received between these elements.

The CPU 901 is an arithmetic processing device that controls an operation of the entire computer 9 by executing various programs included in an operating system.

The main storage device 902 includes a read-only memory (ROM) and a random access memory (RAM) (neither of which is illustrated). For example, a predetermined basic control program read by the CPU 901 at the time of activation of the computer 9 is recorded in advance in the ROM. The RAM is used as a working storage area, as inevitable, when the CPU 901 executes various programs. For example, the RAM of the main storage device 902 can be used to temporarily store the current processing target picture (the original image data), the local decoded image, the ON/OFF information of the ACT, the ACT map, and the like.

The auxiliary storage device 903 is a storage device, such as a hard disk drive (HDD) or a solid state drive (SSD), that has a larger capacity than the main storage device 902. Various kinds of data or various programs to be executed by the CPU 901 can be stored in the auxiliary storage device 903. Examples of the programs stored in the auxiliary storage device 903 include application programs which execute encoding or reproduction of moving picture data and programs which generate (create) moving picture data. Examples of the data stored in the auxiliary storage device 903 include encoding target moving picture data and encoded moving picture data.

The input device 904 is, for example, a keyboard device or a mouse device. When the input device 904 is operated by an operator of the computer 9, input information associated with operation content is transmitted to the CPU 901.

The display device 905 is, for example, a liquid crystal display. The display device 905 displays various kinds of text, images, and the like according to display data transmitted from the CPU 901 or the like.

The DSP 906 is an arithmetic processing device that executes some of the processes in the moving picture data encoding process according to control signals or the like from the CPU 901.

The interface device 907 is an input and output device that connects the computer 9 to another electronic apparatus to enable transmission and reception of data between the computer 9 and the other electronic apparatus. The interface device 907 includes, for example, a terminal which can connect a cable having a connector of a Universal Serial Bus (USB) standard and a terminal which can connect a cable having a connector of a High-Definition Multimedia Interface (HDMI (registered trademark)) standard. An example of the electronic apparatus connected to the computer 9 by the interface device 907 includes an imaging apparatus such as a video camera.

The storage medium driving device 908 reads a program or data recorded in a portable storage medium (not illustrated) and writes data stored in the auxiliary storage device 903 on a portable storage medium. As the portable storage medium, for example, a flash memory having a connector of a USB standard can be used. As the portable storage medium, an optical disc such as a compact disk (CD), a digital versatile disc (DVD), or a Blu-ray disc (where Blu-ray is a registered trademark) can be used.

The communication device 909 is a device that connects the computer 9 to a communication network such as the Internet or a local area network (LAN) so that communication can be executed and control the communication with another communication terminal (computer) via the communication network. The computer 9 can transmit and receive encoded moving picture data (a bit stream) to another communication terminal via the communication device 909 and the communication network.

In the computer 9, the CPU 901 reads a program including the above-described encoding process from the auxiliary storage device 903 or the like and executes an encoding process and a decoding process on the moving picture data in cooperation with the DSP 906, the main storage device 902, the auxiliary storage device 903, and the like. At this time, the CPU 901 causes the DSP 906 to execute arithmetic processes such as the ON/OFF determination of the mACT, the prediction process based on the determination result, the orthogonal transform and the quantization subjected to the prediction process, and the entropy encoding, and the decoding process.

For example, the moving picture data (encoded bit stream) encoded by the computer 9 can be transmitted to another computer or the like via the foregoing communication network. The moving picture data encoded by the computer 9 can also be stored in the auxiliary storage device 903 to be decoded (reproduced) by the computer 9 as inevitable. Further, the moving picture data encoded by the computer 9 can also be stored in a recording medium a recording medium using the storage medium driving device 908 for distribution.

The computer 9 used as the moving picture encoding apparatus 1 may not necessarily include all of the constituent elements illustrated in FIG. 15, but some of the constituent elements may also be omitted according to use purposes or conditions. For example, in a case in which the processing capability of the CPU 901 is high, the DSP 906 may be omitted and the foregoing encoding and decoding processes may be executed by the CPU 901. In a case in which the moving picture data encoding process or the like is configured to be executed by the DSP 906, for example, an external memory that stores the moving picture data to be subjected to the encoding process may be installed apart from the foregoing main storage device (RAM) 902 or auxiliary storage device 903.

The computer 9 is not limited to a general-purpose computer that realizes a plurality of functions by executing various programs, but may be a dedicated information processing apparatus specialized for a moving picture encoding process. Further, the computer 9 may also be a dedicated information processing apparatus specialized for a moving picture encoding process and an encoded moving picture decoding process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. For example, the steps recited in any of the process or method descriptions may be executed in any order and are not limited to the order presented.

What is claimed is:

1. An apparatus for encoding a moving picture, the apparatus comprising:
a memory; and
a processor coupled to the memory and configured to
execute a determination process that includes, determining either color space format between an RGB format and a YUV format in a case in which a prediction selecting one component among three components in a color space format is designated in input moving picture data with the RGB format, in which the RGB format is selected when statistical information regarding each of R, G, and B components in the moving picture data with the RGB format is less than a threshold value and the YUV format is selected when the statistical information is greater than or equal to the threshold value,
execute a selection process, the selection process including selecting either color space format between the RGB format and the YUV format, in which a prediction error signal for the moving picture data with the RGB format is encoded based on a determination result of the determination process, and
execute a transform process, the transform process including executing orthogonal transform and quantization on the prediction error signal in the selected color space format and generating an encoded bit stream using a value subjected to the orthogonal transform and the quantization.

2. The apparatus according to claim 1, wherein the determination process includes determining either color space format between the RGB format and the YUV format, in which the intra prediction and the inter prediction are executed based on a magnitude of a variance of each of the R, G, and B components in the moving picture data with the RGB format.

3. The apparatus according to claim 1, wherein the processor is configured to
execute a predicted image generation process, the predicted image generation process including generating a predicted image based on a prediction result of the intra prediction and the inter prediction executed for each processing block included in a processing target picture in the moving picture data,
execute a prediction error signal generation process, the prediction error signal generation process including generating a prediction error signal based on the processing block and the predicted image,
execute a first transform process, the first transform process including executing the orthogonal transform and the quantization on the prediction error signal with either the RGB format or the YUV format for each subblock set in the processing block,
execute a second transform process, the second transform process including restoring the prediction error signal by executing inverse quantization and inverse orthogonal transform on the value quantized through the first transform process,
execute a color space restoration process, the color space restoration process including transforming the subblock subjected to the orthogonal transform and the quantization in the YUV format by the first transform process into the RGB format, and execute an ACT map generation process, the ACT map generation process including generating an ACT map including information regarding a position of the subblock and the number of subblocks transformed from the YUV format to the RGB format by executing the color space restoration process, and wherein the determination process includes executing determining either color space format between the RGB format and the YUV format to execute the intra prediction and the inter prediction based on the ACT map.

4. The apparatus according to claim 3, wherein the determination process includes determining either color space format between the RGB format and the YUV format, in which the intra prediction and the inter prediction are executed on a current processing block based on the ACT map in a reference block at the same position as the current processing block in a reference picture which is referred to in the inter prediction.

5. The apparatus according to claim 3, wherein the determination process includes determining either color space format between the RGB format and the YUV format, in which the intra prediction and the inter prediction are executed on a current processing block based on the ACT map within a reference range of the current processing block in a reference picture which is referred to in the inter prediction.

6. The apparatus according to claim 3, wherein the determination process includes determining either color space format between the RGB format and the YUV format, in which the intra prediction and the inter prediction are executed on a current processing block based on an evaluation value which weights the ACT map within a predetermined range including a position deviated by a global vector or a motion vector indicating a block at the same position as the current processing block in a reference block of a reference picture which is referred to in the inter prediction.

7. The apparatus according to claim 3, wherein the determination process includes setting, as a reference block, a processing block in which a motion vector used to encode the processing block indicates a direction of a current processing block among processing blocks in a reference picture which is referred to in the inter prediction, and determining either color space format between the RGB format and the YUV format, in which the intra prediction and the inter prediction are executed on the current processing block based on the ACT map in the reference block.

8. The apparatus according to claim 1,
wherein the memory is configured to store a reference image used for the intra prediction and the inter prediction, and
wherein the processor is configured to
execute an intra prediction process, the intra prediction process including executing the intra prediction on each processing block,
execute an inter prediction process, the inter prediction process including executing the inter prediction on each processing block, and
execute a color space selection process, the color space selection process including
transforming input image data into the YUV format and inputting the image data to the intra prediction process and the inter prediction process in a case in which the result of executing the determination process indicates that the YUV format is selected for the intra and inter prediction of the image data, and
transforming reference image data read from the memory into the YUV format and inputting the reference image data to the intra prediction process and the inter prediction process.

9. The apparatus according to claim 1, wherein the processor is configured to
execute an intra prediction process, the intra prediction process including executing the intra prediction on each processing block,
execute an inter prediction process, the inter prediction process including executing the inter prediction on each processing block, and
execute a predicted image generation process, the predicted image generation process including generating a predicted image based on a prediction result of the intra prediction and the inter prediction executed for each processing block,
execute a prediction error signal generation process, the prediction error signal generation process including generating a prediction error signal based on the input image data and the predicted image,
execute a first transform process, the first transform process including executing the orthogonal transform and the quantization on the prediction error signal with either the RGB format or the YUV format for each subblock set in the processing block,
execute a second transform process, the second transform process including restoring the prediction error signal by executing inverse quantization and inverse orthogonal transform on the value quantized through the first transform process,
execute a color space restoration process, the color space restoration process including transforming the subblock subjected to the orthogonal transform and the quantization in the YUV format in the first transform process among the subblocks in the restored prediction error signal into the RGB format,
execute a decoded image generation process, the decoded image generation process including generating a decoded image with the RGB format based on the prediction error signal in which all of the subblocks are restored in the RGB format and the predicted image generated through the predicted image generation process and storing the decoded image in the memory,
execute a transform process, the transform process including transforming the decoded image with the RGB format into the YUV format and storing the decoded image in the memory,
execute a color space selection process, the color space selection process including transforming the input image data into the YUV format and inputting the image data to the intra prediction process and the inter prediction process in a case in which it is determined that the intra prediction and the inter prediction are executed on the image data with the YUV format in the determination process, and
execute an acquisition process, the acquisition process including acquiring one of reference images with the RGB format and the YUV format from the memory according to a result of executing the determination process and inputting the reference image to the intra prediction process and the inter prediction process.

10. The apparatus according to claim 1, wherein the YUV format is formed by three components, a luminance component signal Y, a color difference signal Cg of a green component, and a color difference signal Co of an orange component.

11. A method executed by a processor for encoding a moving picture, the method comprising:
executing a determination process that includes, determining either color space format between an RGB format and a YUV format in a case in which a prediction selecting one component among three components in a color space format is designated in input moving picture data with the RGB format, in which the RGB format is selected when statistical information regarding each of R, G, and B components in moving picture data with the RGB format is less than a threshold value, and the YUV format is selected when the statistical information is greater than or equal to the threshold value;
executing a selection process, the selection process including selecting either color space format between the RGB format and the YUV format, in which a prediction error signal for the moving picture data with the RGB format is encoded based on a determination result of the determination process; and
executing a transform process, the transform process including executing orthogonal transform and quantization on the prediction error signal in the selected color space format and generating an encoded bit stream using a value subjected to the orthogonal transform and the quantization.

12. The method according to claim 11, wherein the determination process includes determining either color space format between the RGB format and the YUV format, in which the intra prediction and the inter prediction are executed based on a magnitude of a variance of each of the R, G, and B components in the moving picture data with the RGB format.

13. The method according to claim 11, the method further comprising:
executing a predicted image generation process, the predicted image generation process including generating a predicted image based on a prediction result of the intra prediction and the inter prediction executed for each processing block included in a processing target picture in the moving picture data;
executing a prediction error signal generation process, the prediction error signal generation process including generating a prediction error signal based on the processing block and the predicted image;
executing a first transform process, the first transform process including executing the orthogonal transform and the quantization on the prediction error signal with either the RGB format or the YUV format for each subblock set in the processing block;
executing a second transform process, the second transform process including restoring the prediction error signal by executing inverse quantization and inverse orthogonal transform on the value quantized through the first transform process;
executing a color space restoration process, the color space restoration process including transforming the subblock subjected to the orthogonal transform and the quantization in the YUV format by the first transform process into the RGB format; and
executing an ACT map generation process, the ACT map generation process including generating an ACT map including information regarding a position of the subblock and the number of subblocks transformed from the YUV format to the RGB format by the color space restoration process, and
wherein the determination process includes executing determining either color space format between the RGB format and the YUV format to execute the intra prediction and the inter prediction based on the ACT map.

14. The method according to claim 13, wherein the determination process includes determining either color space format between the RGB format and the YUV format, in which the intra prediction and the inter prediction are executed on a current processing block based on the ACT map in a reference block at the same position as the current processing block in a reference picture which is referred to in the inter prediction.

15. The method according to claim 13, wherein the determination process includes determining either color space format between the RGB format and the YUV format, in which the intra prediction and the inter prediction are executed on a current processing block based on the ACT map within a reference range of the current processing block in a reference picture which is referred to in the inter prediction.

16. The method according to claim 13, wherein the determination process includes determining either color space format between the RGB format and the YUV format, in which the intra prediction and the inter prediction are executed on a current processing block based on an evaluation value which weights the ACT map within a predetermined range including a position deviated by a global vector or a motion vector indicating a block at the same position as the current processing block in a reference block of a reference picture which is referred to in the inter prediction.

17. A non-transitory computer-readable storage medium storing a program that causes a processor to execute a process, the process comprising;
executing a determination process that includes, determining either color space format between an RGB format and a YUV format in a case in which a prediction selecting one component among three components in a color space format is designated in input moving picture data with the RGB format, in which the RGB format is selected when statistical information regarding each of R, G, and B components in moving picture data with the RGB format is less than a threshold value, and the YUV format is selected when the statistical information is greater than or equal to the threshold value;
executing a selection process, the selection process including selecting either color space format between the RGB format and the YUV format, in which a prediction error signal for the moving picture data with the RGB format is encoded based on a determination result of the determination process; and
executing a transform process; the transform process including executing orthogonal transform and quantization on the prediction error signal in the selected color space format and generating an encoded bit stream using a value subjected to the orthogonal transform and the quantization.

18. The non-transitory computer-readable storage medium according to claim 17,
wherein the determination process includes
determining either color space format between the RGB format and the YUV format, in which the intra prediction and the inter prediction are executed based on a magnitude of a variance of each of the R, G, and B components in the moving picture data with the RGB format.

19. The non-transitory computer-readable storage medium according to claim 17,
wherein the process comprising:
executing a predicted image generation process, the predicted image generation process including generating a predicted image based on a prediction result of the intra prediction and the inter prediction executed for each processing block included in a processing target picture in the moving picture data;
executing a prediction error signal generation process, the prediction error signal generation process including generating a prediction error signal based on the processing block and the predicted image;
executing a first transform process; the first transform process including executing the orthogonal transform and the quantization on the prediction error signal with either the RGB format or the YUV format for each subblock set in the processing block;
executing a second transform process, the second transform process including restoring the prediction error signal by executing inverse quantization and inverse orthogonal transform on the value quantized through the first transform process;
executing a color space restoration process; the color space restoration process including transforming the subblock subjected to the orthogonal transform and the quantization in the YUV format by the first transform process into the RGB format; and
executing an ACT map generation process, the ACT map generation process including generating an ACT map including information regarding a position of the subblock and the number of subblocks transformed from the YUV format to the RGB format by the color space restoration process, and
wherein the determination process includes executing determining either color space format between the RGB format and the YUV format to execute the intra prediction and the inter prediction based on the ACT map.

20. The non-transitory computer-readable storage medium according to claim 19, wherein the determination process includes determining either color space format between the RGB format and the YUV format, in which the intra prediction and the inter prediction are executed on a current processing block based on the ACT map in a reference block at the same position as the current processing block in a reference picture which is referred to in the inter prediction.

* * * * *